US006862595B1

(12) United States Patent
Elko et al.

(10) Patent No.: US 6,862,595 B1
(45) Date of Patent: Mar. 1, 2005

(54) METHOD AND APPARATUS FOR IMPLEMENTING A SHARED MESSAGE QUEUE USING A LIST STRUCTURE

(75) Inventors: David A. Elko, Austin, TX (US); Richard Dievendorff, Bellevue, WA (US); Dermot J. Flaherty, Southampton (GB); Jeffrey M. Nick, West Park, NY (US); David H. Surman, Milton, NY (US); James H. Warnes, Poughkeepsie, NY (US); Douglas W. Westcott, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 09/677,341

(22) Filed: Oct. 2, 2000

(51) Int. Cl.[7] .............................................. G06F 17/00

(52) U.S. Cl. .......................... 707/10; 709/102; 709/314

(58) Field of Search ............ 707/104.1, 8; 709/102–103, 709/314; 380/30; 710/200

(56) References Cited

U.S. PATENT DOCUMENTS

| 5,317,739 A | 5/1994 | Elko et al. .................. 395/650 |
| 5,331,673 A | 7/1994 | Elko et al. .................. 395/575 |
| 5,339,405 A | 8/1994 | Elko et al. .................. 395/575 |
| 5,339,427 A | 8/1994 | Elko et al. .................. 395/725 |
| 5,388,266 A | 2/1995 | Frey et al. .................. 395/700 |
| 5,390,328 A | 2/1995 | Frey et al. .................. 395/650 |
| 5,392,397 A | 2/1995 | Elko et al. .................. 395/200 |
| 5,394,542 A | 2/1995 | Frey et al. .................. 395/575 |
| 5,394,554 A | 2/1995 | Elko et al. .................. 395/800 |
| 5,410,695 A | 4/1995 | Frey et al. .................. 395/650 |
| 5,450,590 A | 9/1995 | Elko et al. .................. 395/700 |
| 5,457,793 A | 10/1995 | Elko et al. .................. 395/600 |
| 5,463,736 A | 10/1995 | Elko et al. .................. 395/848 |
| 5,465,359 A | 11/1995 | Allen et al. .................. 395/700 |
| 5,493,668 A | 2/1996 | Elko et al. .................. 395/457 |
| 5,515,499 A | 5/1996 | Allen et al. ............ 395/182.03 |
| 5,537,574 A | 7/1996 | Elko et al. .................. 395/468 |
| 5,544,345 A | 8/1996 | Carpenter et al. .......... 395/477 |
| 5,561,809 A | 10/1996 | Elko et al. .................. 395/800 |

(List continued on next page.)

FOREIGN PATENT DOCUMENTS

EP        0817019 A2 * 1/1998 ............. G06F/9/46

OTHER PUBLICATIONS

MQSeries Planning Guide, IBM GC33–1349–07 (Jan. 1999), Eighth Edition.
MVS/ESA "Programming: Sysplex Service Guide", IBM GC28–1495–02, (Jun. 1995),Third Edition, pp. 4.1–4.9.
J. M. Nick et al., "S/390 cluster technology: Parallel Sysplex", IBM Systems Journal, vol. 36, No. 2, 1997, pp. 172–201.
Software Announcement—Feb. 29, 2000 entitled "IBM OS/390 Version 2 Release 9: Transform Your Core Business" pp. 1–20 marked 200–030.
Software Announcement—Aug. 24, 1999 entitled IBM OS/390 Version 2 Release 8 Availability and Release 9—27 pages total marked 299–234.

*Primary Examiner*—Greta Robinson
*Assistant Examiner*—Sathyanarayan Pannala
(74) *Attorney, Agent, or Firm*—William A. Kinnaman, Jr.

(57) ABSTRACT

A method and apparatus for implementing a shared message queue using a list structure. A put list is defined comprising a sequence of list entries, each of which corresponds to a message in the queue and has an associated list entry key. Each list entry key corresponding to an uncommitted message falls within an uncommitted key range defining an uncommitted portion of the put list, while each list entry key corresponding to a committed message falls within a committed key range defining a committed portion of the put list. To write a message to the queue, a list entry is added to the put list having a list entry key within the uncommitted key range.

23 Claims, 13 Drawing Sheets

U.S. PATENT DOCUMENTS

| | | | |
|---|---|---|---|
| 5,581,737 A | 12/1996 | Dahlen et al. | 395/497.01 |
| 5,604,863 A | 2/1997 | Allen et al. | 395/182.09 |
| 5,630,050 A | 5/1997 | Neuhard et al. | 395/183.03 |
| 5,634,072 A | 5/1997 | Allen et al. | 395/674 |
| 5,664,155 A | 9/1997 | Elko et al. | 711/170 |
| 5,737,600 A | 4/1998 | Geiner et al. | 395/616 |
| 5,742,830 A | 4/1998 | Elko et al. | 395/728 |
| 5,860,115 A | 1/1999 | Neuhard et al. | 711/147 |
| 5,875,484 A | 2/1999 | Neuhard et al. | 711/167 |
| 5,893,911 A * | 4/1999 | Piskiel et al. | 707/10 |
| 6,256,634 B1 * | 7/2001 | Moshaiov et al. | 707/100 |
| 6,330,686 B1 * | 12/2001 | Denny et al. | 714/4 |

* cited by examiner

```
          COMMITTED           UNCOMMITTED
      ─ ─ ─ ─ ─ ─ ─ ─ ┼ ─ ─ ─ ─ ─ ─ ─ ─ ─ ─
         M1  M2  M5      M3(NON-P)  M4(PERSISTENT)
```

FIG.16A

```
              COMMITTED            UNCOMMITTED
         ─ ─ ─ ─ ─ ─ ─ ─ ─ ┼ ─ ─ ─ ─ ─ ─ ─ ─ ─ ─ ─
              M1  M2  M5      M4(PERSISTENT)  M3(NON-PERSISTENT)
  PRIORITY    9   9   9            0                  9
```

FIG.16B

```
                 COMMITTED             UNCOMMITTED
            ─ ─ ─ ─ ─ ─ ─ ─ ─ ─ ─ ┼ ─ ─ ─ ─ ─ ─ ─ ─ ─ ─ ─ ─
                 M1  M2  M5         M3(NON-PERSISTENT)  M4(PERSISTENT)

INVERTED       9   9   9                 7                  8
  PRIORITY

INPUT          0   0   0                 2                  1
  PRIORITY (NON INVERTED)
```

FIG.16C

METHOD AND APPARATUS FOR IMPLEMENTING A SHARED MESSAGE QUEUE USING A LIST STRUCTURE

CROSS-REFERENCE TO RELATED APPLICATIONS

This application is related to the following commonly owned copending applications, incorporated! herein by reference:

D. A. Elko et al., Ser. No. 09/677,339, filed concurrently herewith, entitled "METHOD AND APPARATUS FOR PROCESSING A LIST STRUCTURE";

P. Kettley et al., Ser. No. 09/605,589, filed Jun. 28, 2000, entitled "METHOD AND APPARATUS FOR OPERATING A COMPUTER SYSTEM TO ENABLE A RESTART", now abandoned;

P. Kettley et al., Ser. No. 60/220,685, filed Jul. 25, 2000, as a provisional application entitled "METHOD AND APPARATUS FOR IMPROVING MESSAGE AVAILABILITY IN A SUBSYSTEM WHICH SUPPORTS SHARED MESSAGE QUEUES", now abandoned in favor of non provisional application Ser. No. 09/912,279, filed Jul. 24, 2001;

D. J. Dahlen et al., Ser. No. 60/219,889, filed Jul. 21, 2000, as a provisional application entitled "IMPLEMENTING MQI INDEXED QUEUE SUPPORT USING COUPLING FACILITY LIST STRUCTURES", now abandoned in favor of nonprovisional application Ser. No. 09/909,538, filed Jul. 20, 2001.

BACKGROUND OF THE INVENTION

1. Field of the Invention

This invention relates to a method and apparatus for implementing a shared message queue using a list structure and, more particularly, to a method and apparatus for implementing a message queue that is shared across a sysplex using a coupling facility list structure.

2. Description of the Related Art

IBM's MQSeries® is a set of middleware products that allow user applications to rag intercommunicate using messages, without having to know the complexities of the underlying hardware and software platform. Applications communicate using the MQSeries application programming interface (API), issuing such calls as MQPUT to put a message onto a queue and MQGET to get a message from a queue. (In this specification, the terms "get" and "put" are used generally interchangeably with the terms "read" and "write", respectively.) MQSeries is described in such publications as *MQSeries Planning Guide*, IBM GC33-1349-07 (January 1999), incorporated herein by reference:

The IBM S/390® Parallel Sysplex® configuration is a cluster of interconnected processing nodes with attachments to shared storage devices, network controllers, and core cluster technology components, consisting of coupling facilities, coupling support facilities, and external time references (ETRs). A coupling facility (CF) enables high-performance read/write sharing of data by applications running on each node of the cluster through global locking and cache coherency management mechanisms. It also provides cluster-wide queuing mechanisms for workload distribution and message passing between nodes.

The coupling facility is described in the following patents and publications, incorporated herein by reference:

"In a Multiprocessing System Having a Coupling Facility, Communicating Messages Between the Processors and the Coupling Facility in Either a Synchronous Operation or an Asynchronous Operation", by D. A. Elko et al., Ser. No. 08/420,893, filed Apr. 11, 1995, now U.S. Pat. No. 5,561,809;

"Sysplex Shared Data Coherency Method And Means", by D. A. Elko et al., Ser. No. 07/860,805, filed Mar. 30, 1992, now U.S. Pat. No. 5,537,574;

"Method And Apparatus For Distributed Locking Of Shared Data, Employing A Central Coupling Facility", by D. A. Elko et al., Ser. No. 07/860,808, filed Mar. 30, 1992, now U.S. Pat. No. 5,339,427;

"Command Quiesce Function", by D. A. Elko et al., Ser. No. 07/860,330, filed Mar. 30, 1992, now U.S. Pat. No. 5,339,405;

"Software Cache Management Of A Shared Electronic Store In A Sysplex", by D. A. Elko et al., Ser. No. 07/860,807, filed Mar. 30, 1992, now U.S. Pat. No. 5,457,793;

"Multiple Processor System Having Software For Selecting Shared Cache Entries Of An Associated Castout Class For Transfer To A DASD With One 1,0 Operation", by D. A. Elko et al , Ser. No. 07/860,806, filed Mar. 30, 1992, now U.S. Pat. No. 5,493,668;

"Command Execution System For Using First And Second Commands To Reserve And Store Second Command Related Status Information In Memory Portion Respectively", by D. A. Elko et al., Ser. No. 07/860,378, filed Mar. 30, 1992, now U.S. Pat. No. 5,392,397;

"Integrity Of Data Objects Used To Maintain State Information For Shared Data At A Local Complex", by D. A. Elko et al , Ser. No. 07/860,800, filed Mar. 30, 1992, now U.S. Pat. No. 5,331,673;

"Management Of Data Objects Used To Maintain State Information For Shared Data At A Local Complex", by J. A. Frey et al, Ser. No. 07/860,797, filed Mar. 30, 1992, now U.S. Pat. No. 5,388,266;

"Clearing Data Objects Used To Maintain State Information For Shared Data At A Local Complex When At Least One Message Path To The Local Complex Cannot Be Recovered", by J. A. Frey et al., Ser. No. 07/860,647, filed Mar. 30, 1992, now U.S. Pat. No. 5,394,542;

"Coupling Facility For Receiving Commands From Plurality Of Hosts For Activating Selected Connection Paths To I/O Devices And Maintaining Status Thereof", by D. A. Elko et al., Ser. No. 08/324,447, filed Oct. 18, 1994, now U.S. Pat. No. 5,463,736;

"Data Processing System And Method For Providing Notification In A Central Processor Of State Changes For Shared Data Structure On External Storage", by J. A. Frey et al., Ser. No. 07/860,809, filed Mar. 30, 1992, now U.S. Pat. No. 5,390,328;

"Method And Apparatus For Performing Conditional Operations On Externally Shared Data", by J. A. Frey et al., Ser. No. 08/383,532, filed Feb. 1, 1995, now U.S. Pat. No. 5,742,830;

"Apparatus And Method For List Management In A Coupled Data Processing System", by J. A. Frey et al., Ser. No. 07/860,633, filed Mar. 30, 1992, now U.S. Pat. No. 5,410,695;

"Interdicting I/O And Messaging Operations In A Multi-System Complex", by D. A. Elko et al., Ser. No. 07/860,489, filed Mar. 30, 1992, now U.S. Pat. No. 5,394,554;

"Method And Apparatus For Coupling Data Processing Systems", by D. A. Elko et al., Ser. No. 07/860,803, filed Mar. 30, 1992, now U.S. Pat. No. 5,317,739;

"Authorization Method For Conditional Command Execution", by D. A. Elko et al., Ser. No. 08/408,446, filed Mar. 22, 1995, now U.S. Pat. No. 5,450,590;

"Dynamically Assigning a Dump Space in a Shared Data Facility to Receive Dumping Information to be Captured", by D. A. Elko et al., Ser. No. 08/471,895, filed Jun. 7, 1995, now U.S. Pat. No. 5,664,155;

"Method And System For Capturing and Controlling Access To Information In A Coupling Facility", by D. E. Neuhard et al., Ser. No. 08/146,647, filed Nov. 1, 1993, now U.S. Pat. No. 5,630,050;

"Method and System for Determining and Overriding Information Unavailability Time at a Coupling Facility", by D. A. Neuhard et al., Ser. No. 08/779,196, filed Jan. 6, 1997, now U.S. Pat. No. 5,875,484;

"Requesting a Dump of Information Stored within a Coupling Facility, in Which the Dump Includes Serviceability Information from an Operating System That Lost Communication with the Coupling Facility", by D. A. Neuhard et al., Ser. No. 08/779,195, filed Jan. 6, 1997, now U.S. Pat. No. 5,860,115;

"Method and Apparatus for Expansion, Contraction, and Reapportionment of Structured External Storage Structures", by D. J. Dahlen et al., Ser. No. 08/304,458, filed Sep. 12, 1994, now U.S. Pat. No. 5,581,737;

"Method of Managing Resources in One or More Coupling Facilities Coupled to One or More Operating Systems in One or More Central Programming Complexes Using a Policy", by R. A. Allen et al., Ser. No. 08/607,053, filed Feb. 26, 1996, now U.S. Pat. No. 5,634,072;

"Method and System for Managing Data and Users of Data in a Data Processing System", by R. A. Allen, Ser. No. 08/146,727, filed Nov. 1, 1993, now U.S. Pat. No. 5,465,359;

"Method and System for Reconfiguring a Storage Structure Within a Structure Processing Facility", by R. A. Allen et al., Ser. No. 08/544,941, filed Oct. 18, 1995, now U.S. Pat. No. 5,515,499;

"Method for Coordinating Executing Programs in a Data Processing System", by R. A. Allen et al., Ser. No. 08/439,269, filed May 9, 1995, now U.S. Pat. No. 5,604,863;

"Coherence Controls for Store-Multiple Shared Data Coordinated by Cache Directory Entries in a Shared Electronic Storage", by K. S. Carpenter et al., Ser. No. 08/148,707, filed Nov. 8, 1993, now U.S. Pat. No. 5,544,345;

"Method and System for Log Management in a Coupled Data Processing System", by R. V. Geiner et al., Ser. No. 08/6321683, filed Apr. 15, 1996, now U.S. Pat. No. 5,737,600; and J. M. Nick et al., "S/390 cluster technology: Parallel Sysplex", *IBM Systems Journal*, vol. 36, no. 2, 1997, pages 172–201.

It would be desirable to be able to use the list-processing capabilities of the coupling facility to implement a message queue that is shared by queue managers residing on different systems across a sysplex. To be suitable for this purpose, the CF list architecture should allow MQSeries to efficiently implement the following message-queuing semantics:

1. A message must be uniquely identified.
2. A message put to a queue cannot be visible to other units of work (UOWs) until it is committed.
   When a message is written (put) to a queue by a UOW, it must not be visible to other units of work anywhere in the queue-sharing group (QSG) until the message is committed. The uncommitted message however is available to the unit of work that wrote it.
3. Committed messages must be maintained in proper sequence.
   Committed messages eligible to be read must be in priority sequence, from highest priority to lowest priority. If there are multiple messages with the same priority, then the set of messages must be maintained in order of arrival sequence within designated priority.
4. Messages read from a queue must be unavailable to others UOWs in the QSG.
   When a committed message is read (gotten) by a unit of work, then no other unit of work anywhere in the queue-sharing group can read the same message. If the read is committed, the message must be deleted from the CF list structure so that it is never visible again to another unit of work.
5. Messages read that are backed out must be reinserted into their proper committed positions with respect to both priority and time of arrival.
   If the read is backed out, the message must again become visible to other units of work executing in the queue-sharing group. When the get is backed out, the message must be reinserted into the committed portion of a list with respect to both its priority and its time of arrival (when the message was originally put).
6. Committing and aborting messages for a UOW must be efficient

SUMMARY OF THE INVENTION

In general, the present invention contemplates a method and apparatus for implementing a shared message queue using a list structure. A put list is defined comprising a sequence of list entries, each of which corresponds to a message in the queue and has an associated list entry key. Each list entry key corresponding to an uncommitted message falls within an uncommitted key range defining an uncommitted portion of the put list, while each list entry key corresponding to a committed message falls within a committed key range defining a committed portion of the put list. To write a message to the queue, a list entry is added to the put list having a list entry key within the uncommitted key range. Putting messages initially into the uncommitted portion of the put list in this manner hides uncommitted puts from other units of work (which only look at the committed list portion) without requiring explicit locking protocols.

List entry keys in the uncommitted key range are assigned in order of message priority and in order of arrival time for messages of a given priority. Each list entry key has a more significant portion indicating the list portion to which the corresponding list entry belongs and a less significant portion indicating the order of the list entry in the list portion. To commit messages to the queue, the list entry keys associated with the list entries are modified to fall within the committed key range to move the list entries to the committed portion of the put list while preserving their relative order as determined by the list entry keys.

To read a message from the queue, the list entry whose list entry key has the lowest value in the committed key range is moved from the committed portion of the put list to a get list defined for the queue manager. This insures that only the highest-priority committed message is returned in response to a read request without knowing the key of the entry to be read. Also, this insures no other unit of work can read a message that another unit of work has already read. Again, this is accomplished without requiring any explicit locking protocols.

If there are no messages currently in the committed portion of the put list, the requester waits and is notified of a subsequent change in state of the committed portion of the list from an empty state to a not-empty state. Monitoring the committed key range in this manner allows a requester to know when a committed message of any priority is available for reading without having to know the explicit key beforehand.

To abort a read of the message from the queue, the list entry is moved back from the get list to the committed portion of the put list. To commit a read of the message from the queue, the list entry is removed from the get list.

BRIEF DESCRIPTION OF THE DRAWINGS

FIGS. 16A–16C show various examples of messages on a put list header.

DESCRIPTION OF THE PREFERRED EMBODIMENTS

General Operation

The following terms, used throughout this description, are reproduced here for ready reference.

A "backout" (or "abort") is an operation that reverses all the changes made during the current unit of work. After the operation is complete, a new unit of work begins.

A "commit" is an operation that applies all the changes made during the current unit of work. After the operation is complete, a new unit of work begins.

A "syncpointi" is an intermediate or end point during processing of a transaction at which the transaction's protected resources are consistent. At a syncpoint, changes to the resources can safely be committed, or they can be backed out to the previous syncpoint.

A "unit of work" is a recoverable sequence of operations performed by an application between two points of consistency. A unit of work begins when a transaction starts or after a user-requested syncpoint. It ends either at a user-requested syncpoint or at the end of a transaction.

Figure 1:
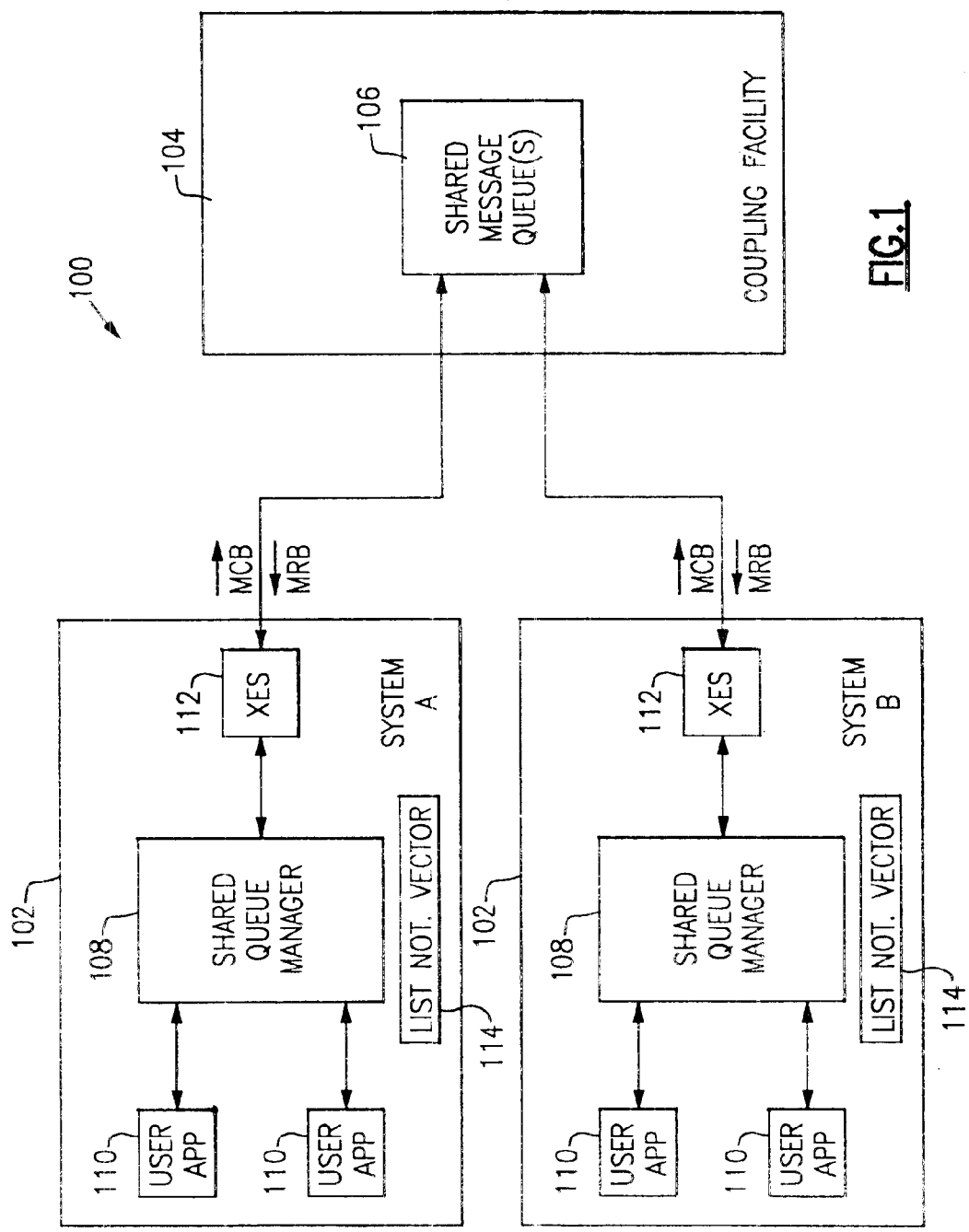
FIG. 1 shows a multiple-system complex (sysplex) incorporating the present invention.

FIG. 1 shows the general configuration of a system complex (sysplex) 100 incorporating the present invention. Sysplex 100 comprises a plurality of systems 102 (an exemplary two of which, System A and System B, are shown), each of which is connected to a coupling facility (CF) 104 within which one or more shared message queues 106 are maintained. As is conventional, each system 102 comprises one or more processors and an operating system (not separately shown) and may constitute either a separate physical machine or a logical partition of a logically partitioned machine. Similarly, coupling facility 104 may constitute either a separate physical machine or a logical partition of a logically partitioned machine. Although the invention is not so limited, in a preferred embodiment the physical machines are IBM S/390 Parallel Enterprise Server® processors, while the operating system is the IBM OS/390® operating system.

Within each system 102, user applications 110 perform sequences of operations, referred to herein as units of work (UOWs), on shared message queues 106 via a shared queue manager (SQM) 108 resident on that system. Shared queue managers 108 on different systems 102 that share the same message queue 106 are referred to herein as a queue-sharing group (QSG). In the preferred embodiment, each shared queue manager 108 in turn interacts with the coupling facility via a component 112 of the OS/390 operating system known as Sysplex Services for Data Sharing (XES). Sysplex Services for Data Sharing (XES) is described more fully in the IBM publication *MVS/ESA Programming: Sysplex Services Guide*, GC28-1495-02 (June 1995), incorporated herein by reference.

User applications 110 on a system 102 interact with the shared queue manager 108 on that system via a series of Message Queue Interface (MQI) calls, the most important of which are MQPUT (to put a message onto a message queue 106) and MQGET (to get a message from a message queue 106). In response to such a call, shared queue manager 108 issues a call to XES 112 to invoke a requested system service (e.g., IXLLSTC, IXLLSTE and IXLLSTM, as described below) to communicate with the coupling facility 104. In response to receiving a call from a shared queue manager 108, XES 112 sends an appropriate message command block (MCB) containing data and other operands to the coupling facility 104 to perform the requested operation. XES 112 receives back from the coupling facility 104 a message response block (MRB) containing data and/or a response code.

Figure 10:
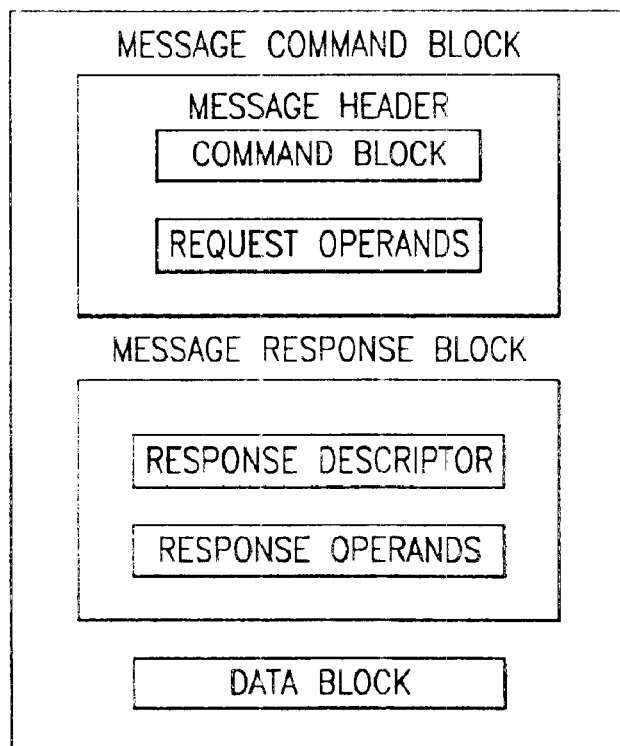
FIG. 10 shows a message command/response block.

FIG. 10 shows the format of a message command/response block 1000 used for communications between the coupling facility 104 and a particular system 102. Message command/response block 1000 comprises a message command block (MCB) 1002, a message response block (MRB) 1004, and an optional data block 1006. Message command block 1002 contains a command block 1008 and request operands 1010. Similarly, message response block 1004 contains a response descriptor 1012 and response operands 1014. Command block 1008 contains a command code (CC) specifying the type of operation to be performed by coupling facility 104, while request operands 1010 constitute input parameters, as described in the referenced related application.

Figure 2:
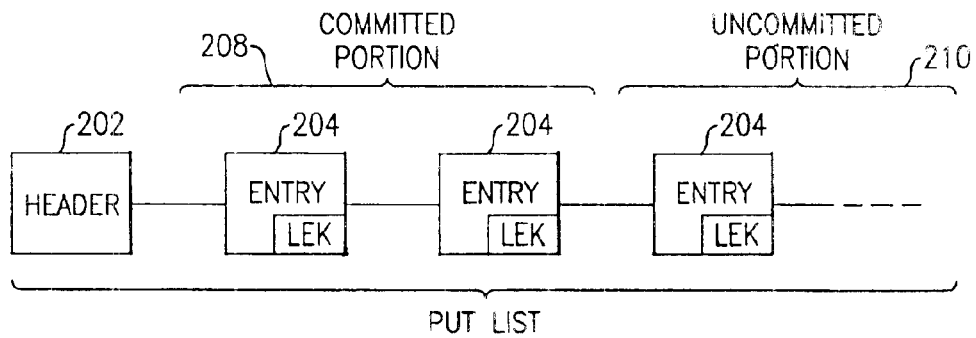
FIG. 2 shows a put list associated with a particular shared queue, with committed and uncommitted portions.
Figure 3:
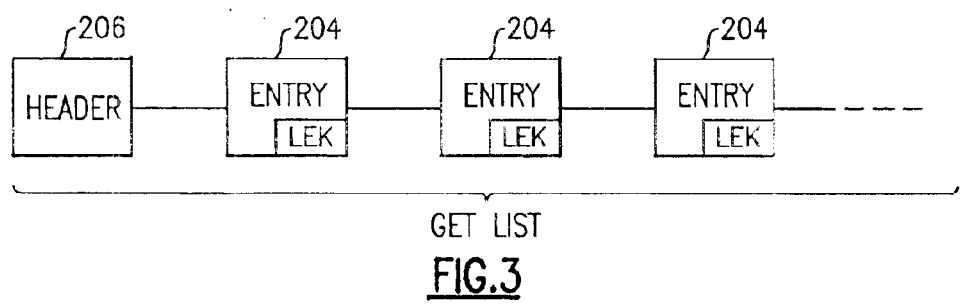
FIG. 3 shows a get list associated with a particular shared queue manager.

As part of its list-processing capability, coupling facility 104 performs requested operations on lists composed of one or more entries. Referring now to FIGS. 2 and 3, in accordance with one aspect of the present invention, each logical message queue 106 is implemented as a set of lists: a put list 202, comprising a put list header (PLH) and optionally one or more list entries 204, and one or more get lists 206 (one get list for each shared queue manager 108), each comprising a get list header (GLH) and optionally one or more list entries 204. (The terms "list" and "list header" are used interchangeably herein in view of their one-to-one correspondence.) Each put list 202 is associated with a particular shared queue 106 and is shared by the shared queue managers 108 in the queue-sharing group. Each get list 206, on the other hand, is associated with a particular shared queue manager 108 and may be used for messages gotten from multiple shared queues 106. Each list entry 204 corresponds to a message. (The terms "list entry" and "message" are used interchangeably herein.) Associated with each list entry 204, along with a message and other data, is a list entry key LEK that is used to determine the order of the entry 204 in the list 202 or 206. Keys LEK enforce the order of entries on a list 202; more particularly, the keys form the basis for partitioning the put list 202 into a committed portion 208, in which the keys LEK fall within a committed key range, and an uncommitted portion 210, in which the keys LEK fall within an uncommitted key range that does not overlap the committed key range.

Lists 202 and 206 and key ranges 208 and 210 supply the mechanism for writing, reading and committing messages 204 in accordance with the present invention. More particularly, the process of 'hiding' uncommitted put messages 204, hiding messages 204 that have been read, and making committed puts globally visible is done simply by movement between list headers 202 and 206 and/or key assignment changes without the use of any explicit locking protocols.

Figure 4:
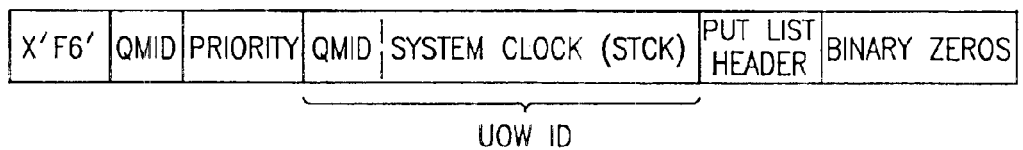
FIG. 4 shows the format of a list entry key falling within the uncommitted key range.
Figure 8A:
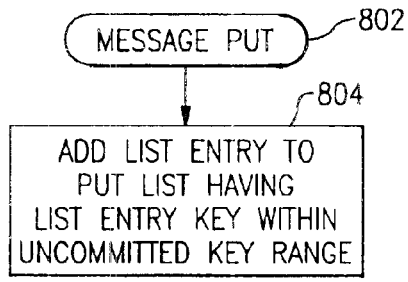
FIG. 8A shows the procedure for writing a message to a queue.

The keys LEK that a list entry (message) 204 can be assigned are defined by the shared queue manager 108, as described below. Referring to FIGS. 4 and 8A, when a message 204 is initially put (step 802), it is first assigned the following 16-byte key LEK in the uncommitted key range (step 804):

1 byte—value is X'F6'
1 byte—queue manager ID (QMID) of the shared queue manager 108 that wrote the message 204
1 byte—priority of the message 204 (inverted to accommodate the CF list architecture as described below)
8 bytes—UOW ID: 1-byte queue manager ID (QMID) concatenated with a 7-byte system clock.(STCK) value; this UOW ID uniquely sequences the message by the shared queue manager 108 that wrote the message and the message's arrival time.
2 bytes—put list header (PLH): the list header 202 to which the message 204 was put
3 bytes—binary zeros The set of list entries 204 whose key LEK begins with X'F6' define the uncommitted portion 210 of the (put) list header 202.

Figure 5:
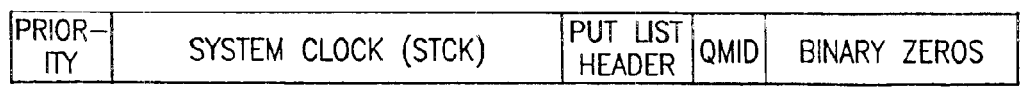
FIG. 5 shows the format of a list entry key falling within the committed key range.
Figure 6:
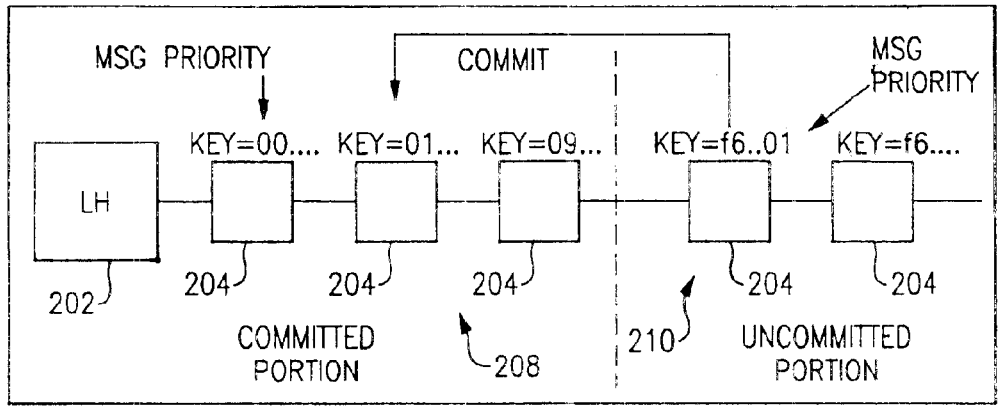
FIG. 6 shows the movement of list entries between the uncommitted and committed portions of a put list.
Figure 8B:
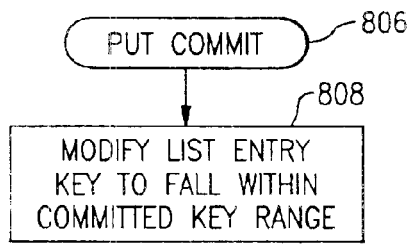
FIG. 8B shows the procedure for committing a write of a message to a queue.

Referring to FIGS. 6 and 8B, when an uncommitted message 204 (first byte of key LEK is X'F 6') is committed (step 806), it is moved from the uncommitted portion 210 of the list header 202 to the committed portion 208 of the same list header 202. In this case, the list entry 204 moves from one position on the list header 202 to another position on the same list header 202. The movement is accomplished by changing the list entry's key LEK so that it falls within the committed key range (step 808). Referring to FIG. 5, the uncommitted put key LEK is changed to the following:

1 byte—priority in the inclusive range (0 . . . 9) (inverted to accommodate the CF list architecture as described below)
8 byte—STCK value (from the uncommitted key, see above)
2 byte—put list header 202 (from the uncommitted key)
1 byte—queue manager ID (QMID) of the shared queue manager 108 that wrote the message 204
4 bytes—binary zeros The set of list entries 204 whose keys begin with (00 . . . 09) inclusive defines the committed portion 208 of the put list header 202.

Figure 8C:
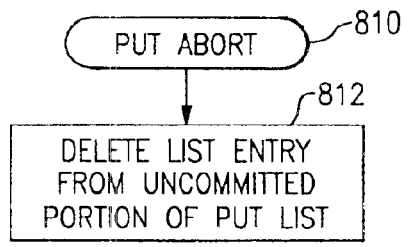
FIG. 8C shows the procedure for aborting a write of a message to a queue.

Referring to FIG. 8C, if a unit of work decides to abort a write of a message 204 (step 810), it deletes the message 204 from the uncommitted portion 210 of the put list 202 (step 812). This portion 210 of the put list is available only to the unit of work that originally wrote the message 204 and is invisible to other units of work.

Figure 7:
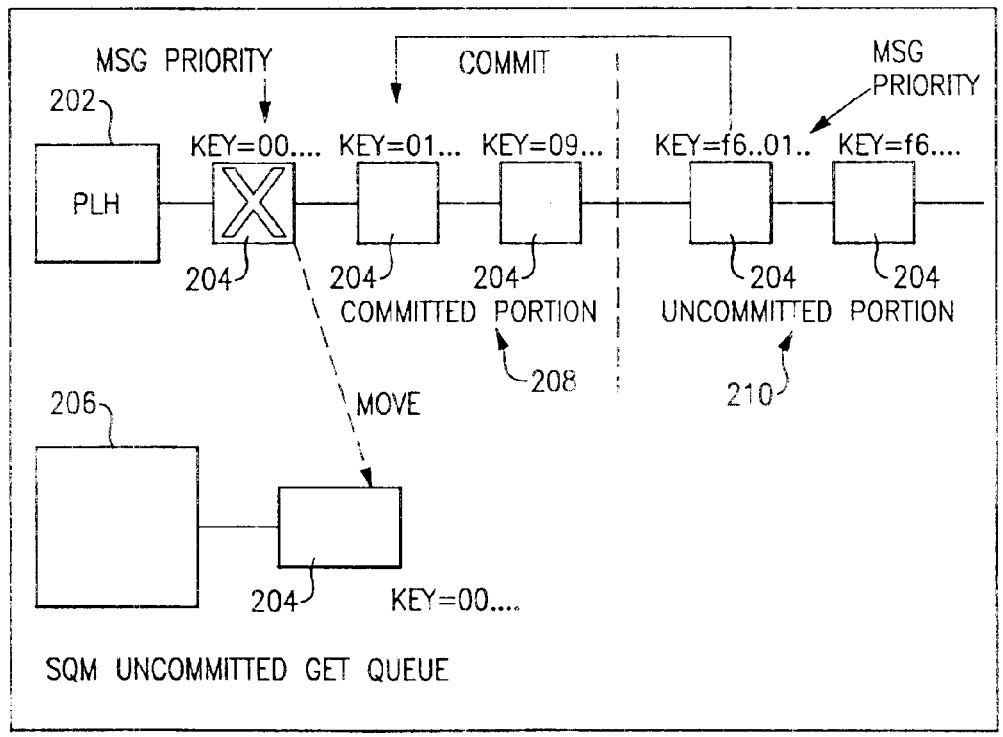
FIG. 7 shows the movement of list entries between a put list and a get list.
Figure 8E:
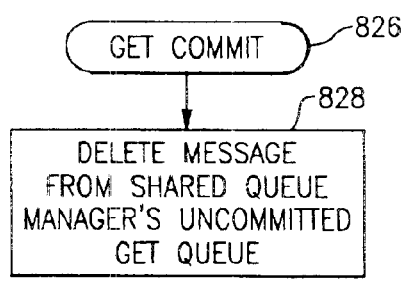
FIG. 8E shows the procedure for committing a read (get) of a message from a queue.
Figure 8D:
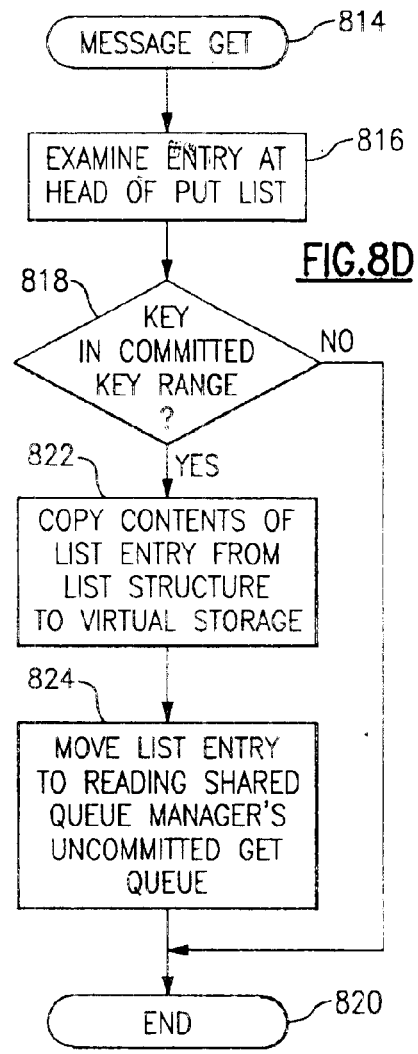
FIG. 8D shows the procedure for reading (getting) a message from a queue.

Referring to FIGS. 7 and 8D, when a unit of work requests the highest committed message 204 on a get request (step 814), only the committed portion 208 of the list header 202 is eligible to be scanned, that is, list entries 202 whose keys begin with (00 . . . 09) inclusive. Entries 204 that begin with X'F 6' do not participate in the scan.

This is accomplished by using an IXLLSTE invocation (as described below) that examines the entry 204 at the head of the list 202 (step 816) and returns it only if the first byte of its key is in the inclusive range (00 . . . 09). (This is referred to herein as key range checking on read.) If there are no messages 204 on the list header 202 or if the key of the message at the head of the list header begins with a value outside the committed key range (step 818), then no message is returned (step 820).

If there are committed messages 204, then the message 204 that is returned is the message at the head of the list header 202, since the messages 202 are in priority order and within priority by time of arrival. Thus, if the message 204 at the head of the list 202 is a committed message (step 818), then two things happen in an atomic fashion:

1. The contents of the list entry 204 are copied from the list structure into virtual storage (step 822).
2. The selected list entry 204 is moved to the 'reading' shared queue manager 108's uncommitted get queue 206 (step 824). This move operation makes the message 204 invisible to all other shared queue managers 108 in the queue-sharing group who issue a get request to the corresponding PLH 202. As noted earlier, in a list structure, each shared queue manager 108 is assigned its own uncommitted get list header 206.

As noted above, steps 822 and 824 occur atomically, avoiding the need for serialization on the queues.

Once the message 204 is moved to the shared queue manager 108's uncommitted get queue 206, it is no longer visible to other get requests because all get requests for the shared queue 106 reference the shared queue's put list header 202.

Figure 8F:
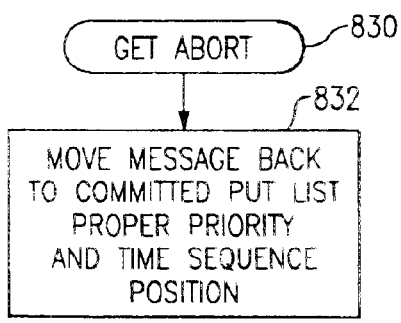
FIG. 8F shows the procedure for aborting a read (get) of a message from a queue.

The final disposition of the message read will be either commit or abort. Referring to FIG. 8E, if the disposition is commit (step 826), the message 204 is deleted from the shared queue manager 108's uncommitted get queue 206 (step 828). Referring to FIG. 8F, if the disposition is abort (step 830), then the message 204 is moved back to the committed portion of the put list header 202 from whence it came into its proper priority/time sequence position (step 832).

Consider the following: at the time of the get request, the message 204 at the head of the list 202 has priority 1. (From an external perspective, MQSeries supports 10 priorities: (0 . . . 9); 0 is the lowest priority, 9 is the highest. However, to accommodate the CF list architecture, in which list entries are arranged in ascending key order, these priorities are inverted when forming a key so that 0 is the highest priority and 9 is the lowest priority, as described below. Unless otherwise indicated, the priorities referred to herein are these inverted priorities.) It is the only committed message 204 on the list header 202. It is moved to the shared queue manager 108's uncommitted get queue 206. The committed portion 208 of the list 202 is now null. While the message 204 is on the uncommitted get queue 206 a unit of work commits a message 204 of priority 0, which puts the message at the head of the put list 202. While the priority 0 message 204 is at the head of the list 202, the unit of work that read the priority 1 message 204 aborts, causing the message to be moved back to the committed portion of the put list header 202. There are now two committed messages 204 on the put list header 202: a message with priority 0 followed by a message with priority 1.

Another example: The only committed message 204 on the put list header 202 is of priority 1. A get request moves the message 204 to the shared queue manager 108's uncommitted get queue 206. The committed portion 208 of the put list 202 is null. While the priority 1 message is on the shared queue manager 108's uncommitted get queue 206, two additional messages 204 are committed, one of priority 0 and one of priority 1. Let's refer to the priority 1 message 204 on the put list 202 as 1'. If the unit of work that read the priority 1 message 204 aborts, then when the entry is returned to the committed portion of the put list header, the order of messages on the put list header 202 is:

Priority 0
Priority 1
Priority 1'

The reason that the priority 1 message 204 is placed before the priority 1' message is that the time stamp component of the priority 1 message (near the front of the list entry's key LEK) is less than the timestamp component of the priority 1' message, since the priority 1 message was written first. (Strictly speaking, it is the order of the shared queue manager 108 assigning the STCK value that matters here, not the order of the write.)

The above discussions provide examples in which there was a single get or put operation in the unit of work. However there can be multiple gets and puts in a unit of work. If a unit of work does 10 puts to the same shared queue 106, then there are 10 list entries 204 for the unit of work on the uncommitted portion 210 of the put list header 202. If the unit of work aborts, those 10 entries 204 are deleted. If the unit of work commits, then those 10 entries 204 are moved (by a key change) from the uncommitted portion 210 to the committed portion 208 of the put list header 202. If the unit of work does 10 gets (possibly one get from 10 different shared queues 106), then there are 10 list entries 204 for the unit of work on the shared queue manager 108's uncommitted: get queue 206. If the unit of work aborts, then the 10 list entries 204 are moved back to their proper positions on the put list header(s) 202 from which they came. If the unit of work commits, then the list entries 204 are deleted from the uncommitted get queue 206.

If a unit of work does 10 puts, each to a different shared queue 106 (each shared queue possibly referencing a different CF list structure) then a commit or abort causes 10 different list headers 202 to be accessed to complete the operation.

The following sections discuss the implementation of get and put processing for nonindexed queues (i.e., queues that are not indexed as described below) and show the IXLLSTE invocations that limit get requests to process only the committed portion 210 of the PLH 202.

The list architecture of coupling facility 104, insofar as it is pertinent to the present application, is fully set forth in the concurrently filed related application referenced above and incorporated herein by reference. A brief summary of this description is set forth below.

Figure 9:
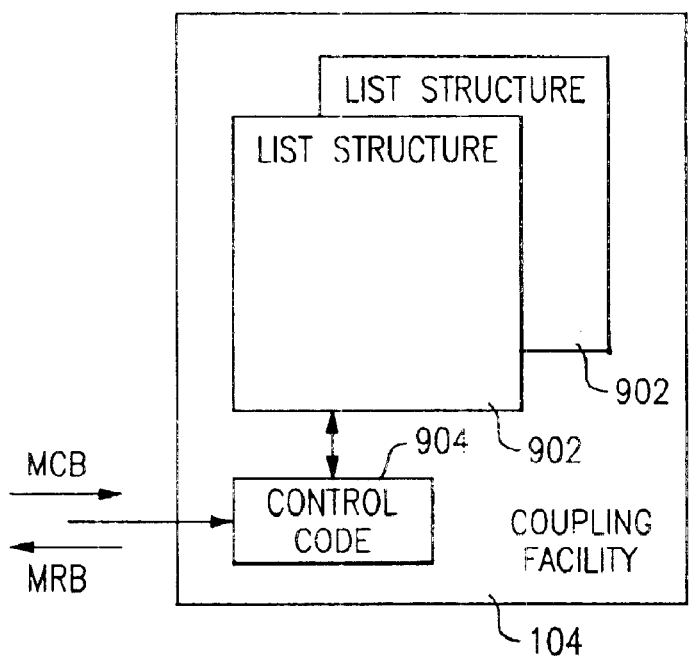
FIG. 9 shows the coupling facility and the list structures that it contains.

Referring to FIG. 9, coupling facility 104 contains microcode 904, also referred to as coupling facility control code (CFCC), for managing one or more list structures 902.

Figure 11:
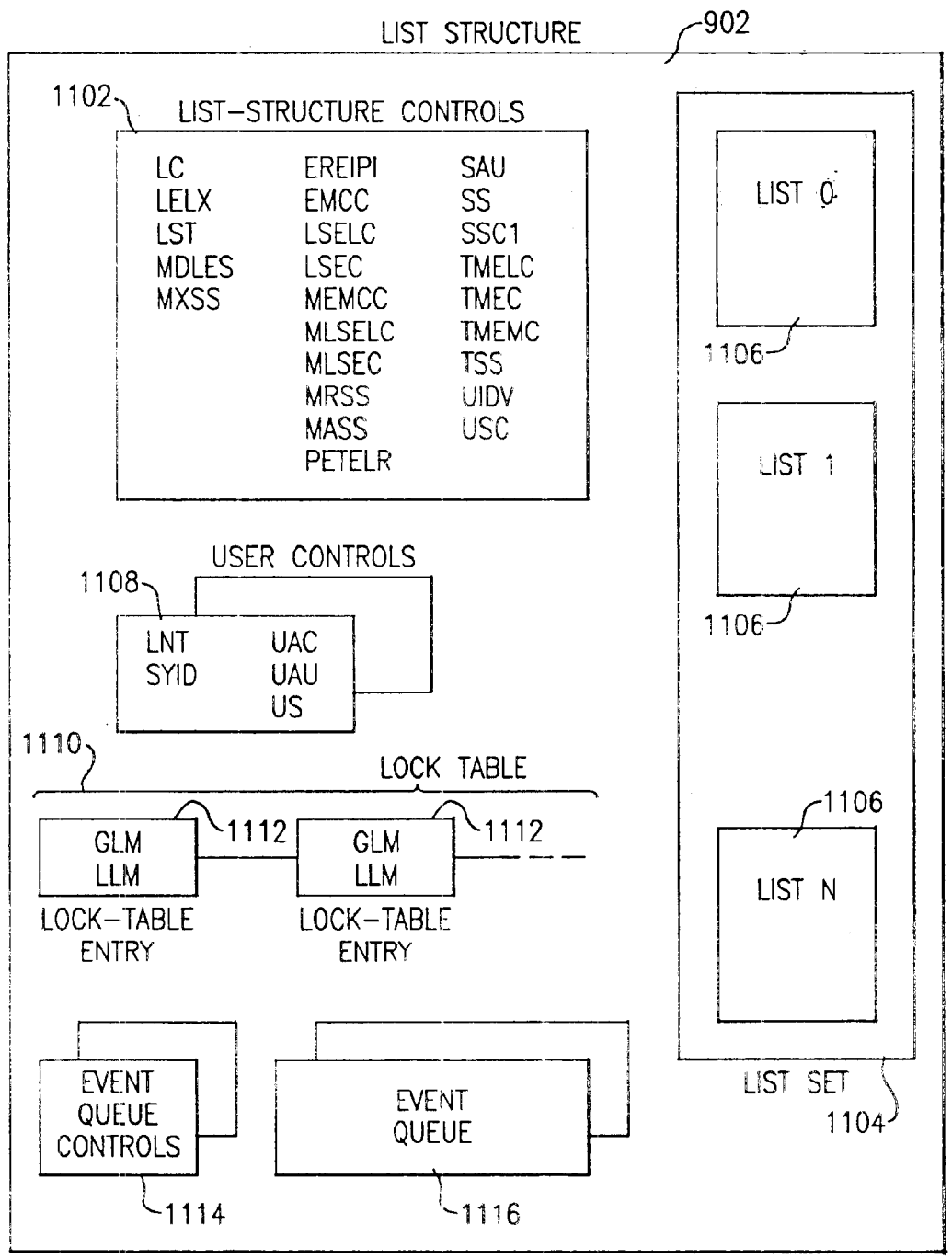
FIG. 11 shows a list structure.

Referring to FIG. 11, each list structure 902 contains a set of list structure controls 1102, a list set 1104 comprising one or more lists 1106, user controls 1108, a lock table 1110 comprising one or more lock table entries (LTEs) 1112, and one or more event queue controls 1114 and corresponding event queues 1116.

A set of user controls 1108 is created for each user (such as a shared queue manager 108 on a system 102, as described below) of a list structure 902. Among the user controls 1108 is a list notification token LNT that specifies a list notification vector 114 (FIG. 1) on the system.

Figure 12:
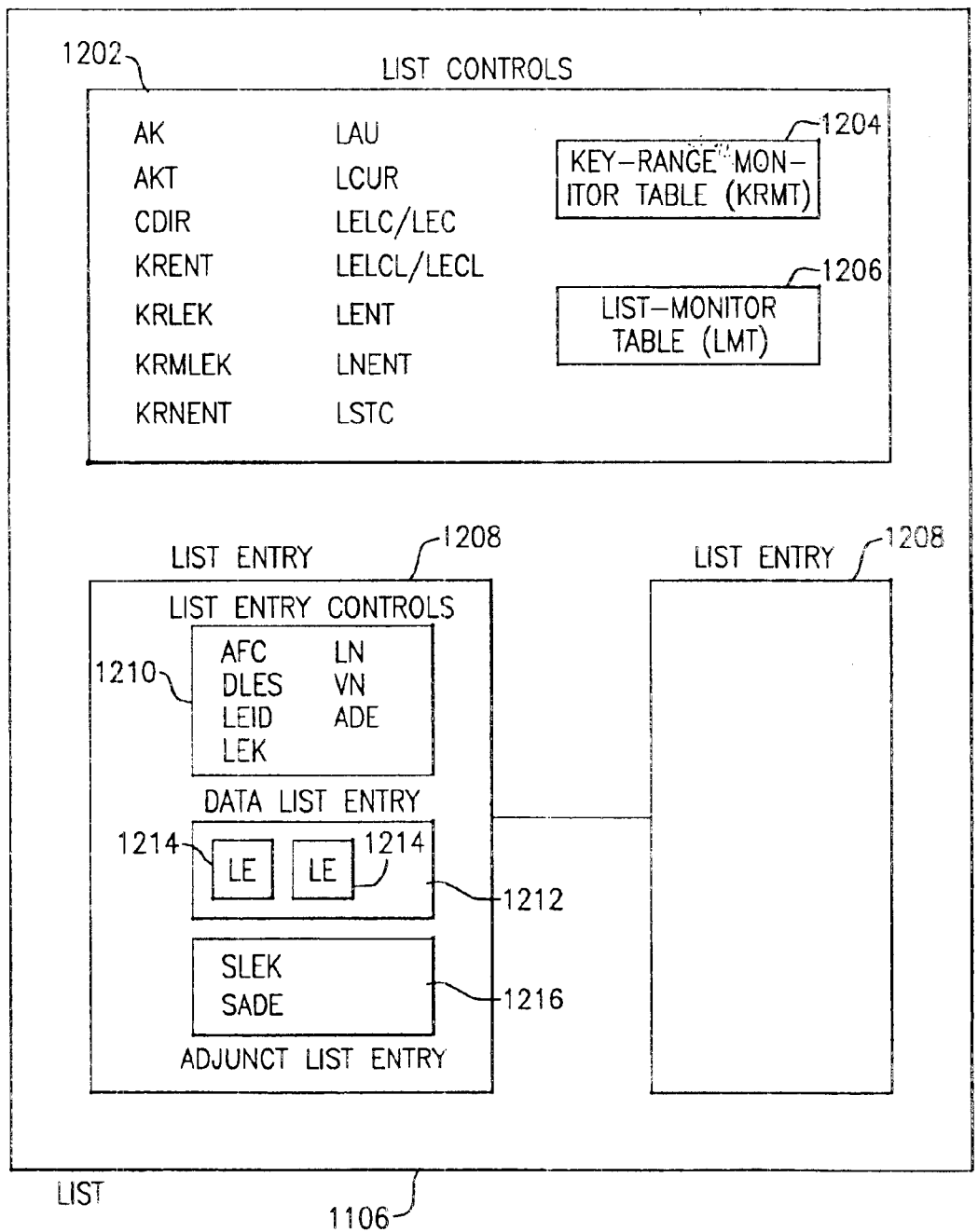
FIG. 12 shows a list.

Referring to FIG. 12, each list 1106 contains list controls 1202 (including a key range monitor table 1204 and a list monitor table 1206) and, optionally, one or more list entries 1208. Each list entry 1208 in turn contains a set of list entry controls 1210 (including a list entry ID (LEID) and a list entry key (LEK), a data list entry 1212 comprising one or more list elements (LEs) 1214, and an adjunct list entry 1216 (including a secondary list entry key SLEK if defined).

Figure 13A:
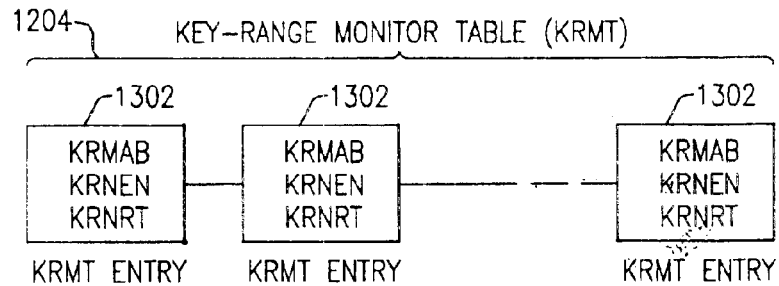
FIG. 13A shows a key range monitor table.

Key range monitor table 1202 contains information used to process the list notification vector 114 of each user who has registered an interest in key range state transitions (as described in the related application referenced above). Referring to FIG. 13A, key range monitor table (KRMT) 1202 comprises an array of KRMT entries 1302 (equal in number to the maximum number of list structure users plus one) indexed by user ID (UID).

Figure 13B:
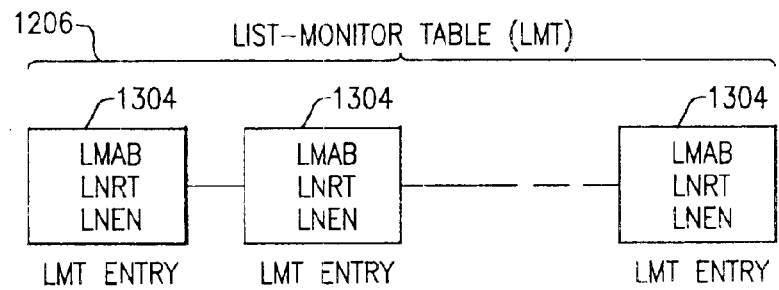
FIG. 13B shows a list monitor table.

Similarly, list monitor table 1204 contains information used to process the list notification vector 114 of each user who has registered an interest in state transitions of the list 1106 (as described in the related application referenced above). Referring to FIG. 13B, list monitor table (LMT) 1204 comprises an array of LMT entries 1304 (equal in number to the maximum number of list structure users plus one) similarly indexed by user ID (UID).

Figure 13C:
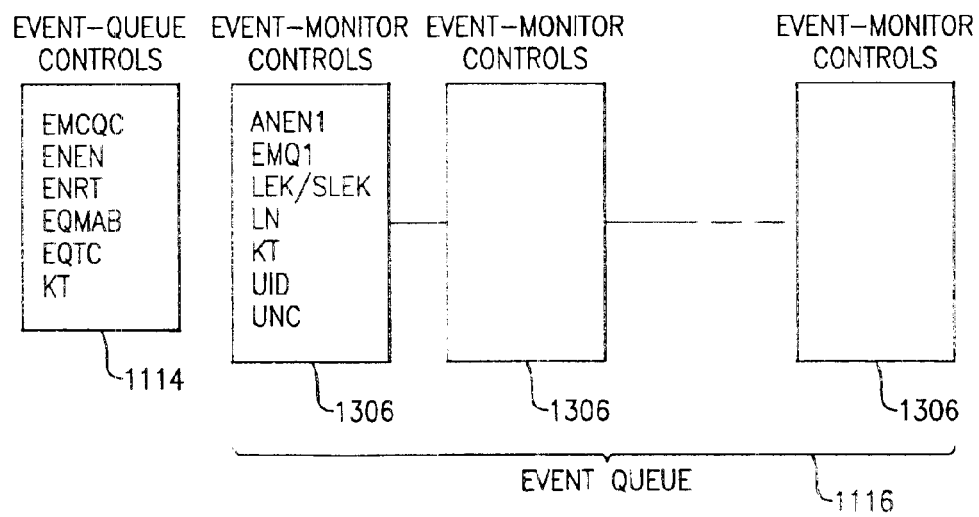
FIG. 13C shows an event queue.

Each user of a list structure 902 has an event queue 1206 for each list entry key type defined for the list structure. Thus, if only primary list entry keys (LEKs) are defined for a list structure 902, then only a primary event queue 1206 is defined for each user. On the other hand, if secondary list entry keys (SLEKs) are also defined for a list structure 902, then a secondary event queue 1206 is also defined for each user. Referring to FIG. 13C, each event queue 1206 comprises a sequence of event monitor controls (EMCs) 1306. Event queue 1206 is used to notify a user (by adding an EMC 1306 to the queue) of such events as the transition of a monitored subsidiary list (a subset of a list whose entries have the same key) to an empty or a nonempty state or to notify the user of the initial state of the subsidiary list, as described in the concurrently filed application of D. A. Elko et al. referred to above.

Specific Implementation

Figure 14:
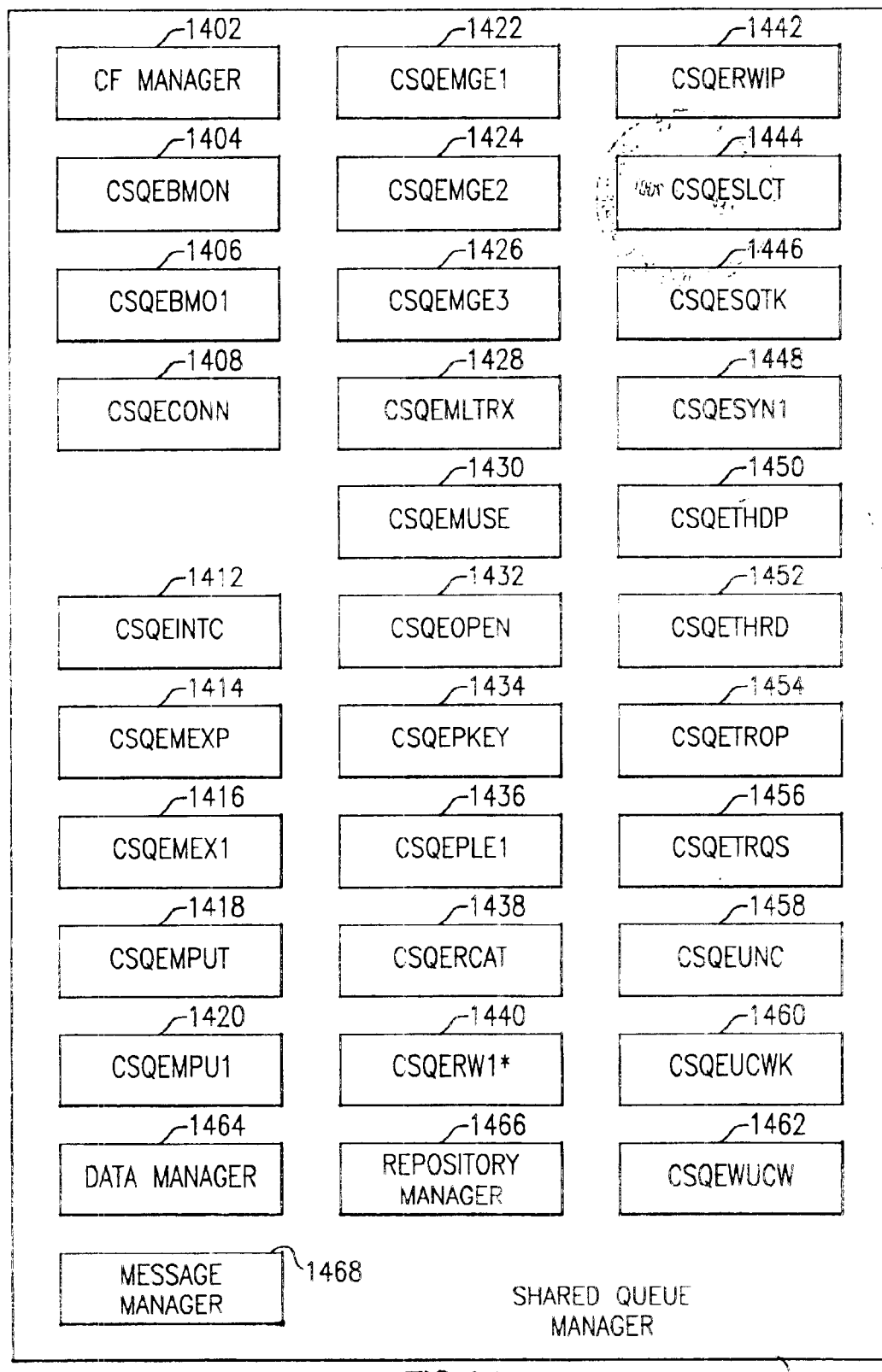
FIG. 14 shows a shared queue manager.

Referring to FIG. 14, the following modules of the shared queue manager 108 support put and get processing.

CSQEMPU1 1420: put of a message 204, either in or out of syncpoint (defined above)

CSQEMGE1 1422: get of a message 204, either in or out of syncpoint

CSQEMGE2 1424: browse message 204 under cursor (a pointer to a specific message in a list as described below)

CSQEMGE3 1426: get message 204 under cursor

CSQESYN1 1448: synch services, Commit, abort or prepare unit of work.

CSQETHDP 1450: thread processing services. Tracks the puts and gets issued by a unit of work across all of the shared queues 106 accessed by the unit of work.

CSQEWUOW 1462: write UOW descriptors (eUOWDs) to an administrative structure.

Each is discussed in detail in the following sections.

Thread Anchor Block (CSQETHRD)

Figure 15:
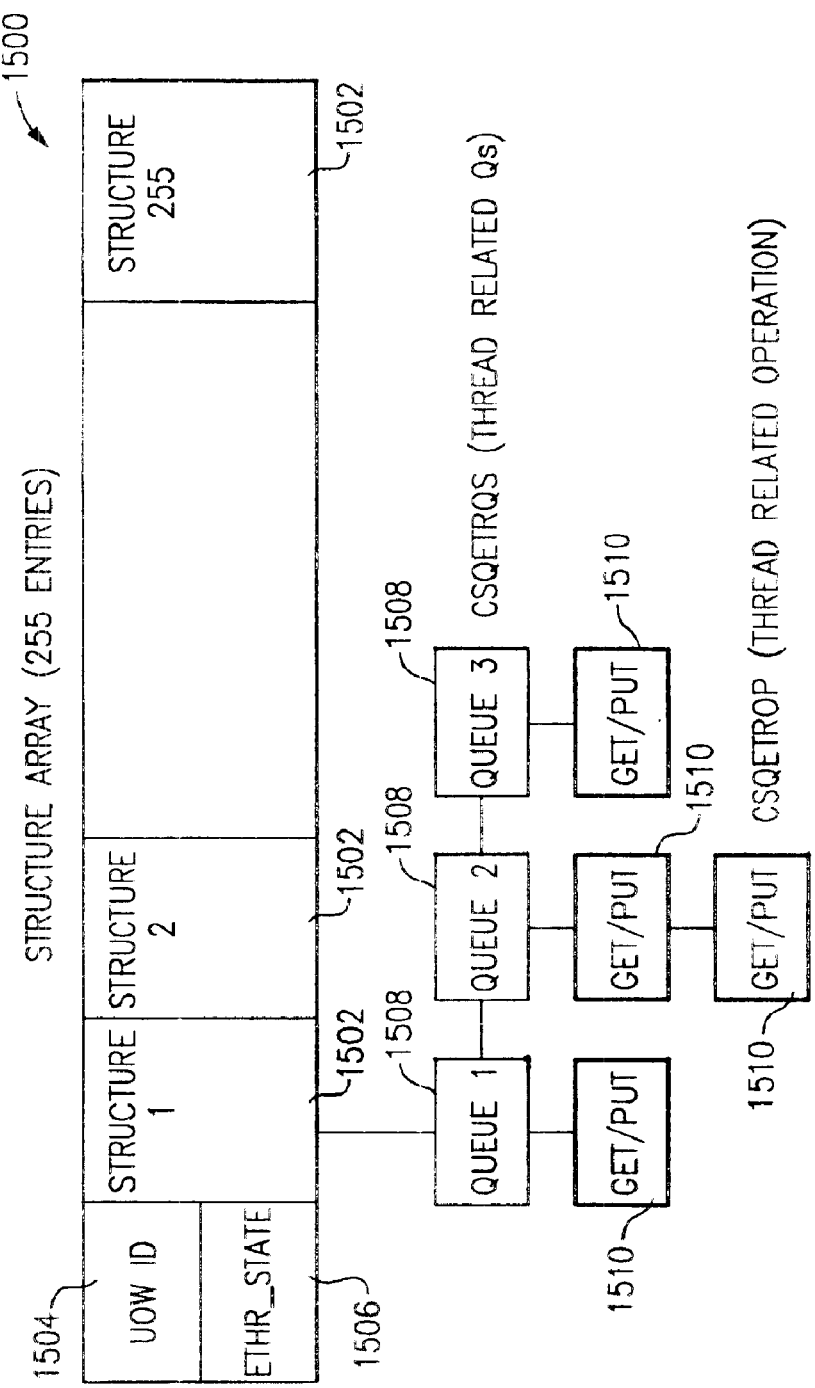
FIG. 15 shows a thread block.

FIG. 15 shows a thread anchor block 1500 which is used to keep track of the shared queues 106 a unit of work accesses and the operations targeted to the set of shared queues 106. The thread anchor block 1500 is accessed during get (get, get under cursor), put and syncpoint processing (commit, abort, prepare).

By way of review, a shared queue 106 maps to (references) a CF list structure 902. Shared queues 106 are defined through interactions with a repository manager 1466, a component of the shared queue manager 108. When a shared queue 106 is defined, it is assigned to a CF list structure 902. When the repository manager 1466 'sees' a list structure name for the first time, it creates a structure record in the repository and assigns the structure 902 a queue-sharing group unique numeric identification in the inclusive range (1 . . . 255). When a shared queue 106 is defined, it too is assigned a unique numeric ID in the inclusive range (1 . . . 512). (This range is specific to this implementation and may differ in another implementation.) This is because 512 different shared queues 106 can reference the same CF list structure 902. Each shared queue 106 is assigned a unique list header 1106 (as a put list header 202) in the CF list structure 902.

In the embodiment shown (other implementations may differ), the maximum number of list structures 902 that can be defined for a sysplex is 255, while the maximum number of concurrent connections to a specific list structure 902 is 32.

CF Manager 1402 is a module of the shared queue manager 108 that directly interacts with XES 112, invoking list structure services as described below. Since the CF Manager 1402 has no way of knowing in advance what shared queues 106 a UOW will access (and to what structures 902 the queues map), it must be prepared to access any one of up to 255 structures 902. Hence the CF thread anchor block 1500 (mapped by a CSQETHRD module 1452) contains an array of 255 elements 1502, array element one representing structure one, array element two representing structure two, and so on.

Besides the 255 array elements 1502, there is a section 1504 that is used to represent the UOW ID. The UOW ID 1504 is an eight-byte field composed of a one-byte numeric queue manager ID concatenated with the high-order 7-bytes of a system clock (STCK) value. A UOW ID 1504 is assigned when a UOW makes its first put or get request.

A shared queue 106 accessed by a UOWV is represented by a control block 1508 known as a TRQS (Thread Related QueueS) and is mapped by a CSQETRQS module 1456. An operation (put or get) against a shared queue 106 is represented by a control block 1510 known as a TROP (Thread Related Operation) and is mapped by a CSQETROP module 1454.

FIG. 15 shows the following:

1. A UOW has accessed three different shared queues 106 (represented by three TRQSes 1508), and each shared queue 106 accessed by the UOW maps to CF list structure 1.

2. One operation (get or put) (represented by a TROP 1510) has been done against Shared Queue 1, two operations have been done against Shared. Queue 2 and one operation has been done against Shared Queue 3.

The UOW's thread structure is processed by CSQETHDP module 1450. The TROPs 1510 are ordered by priority and by time of arrival within priority.

Messages 204 are committed/backed out in priority sequence, from highest priority (which is priority zero) to lowest priority (which is priority 9).

CSQETHDP 1450

Module CSQETHDP 1450 (thread processing) supports the following set of function codes:

CSQE_Create_Or_Add_Thread_Info

This function is requested whenever a UOW issues a put or get of a shared message 204 both in and out of syncpoint. Other input information that is passed across the interface to CSQETHDP 1450 includes a shared queue token (mapped by a CSQESQTK module 1446) which uniquely identifies the shared queue 106 that is being accessed in the shared queue manager 108. From information contained in the shared queue token, information about the corresponding CF list structure 902 can be obtained—an important piece of information is the numeric ID (range: 1–255, inclusive) of the structure 902. The numeric ID is used as an index into the thread block structure array 1500. Each entry 1502 in the thread block structure array 1500 anchors a queue of TRQSes 1508 which represent shared queues 106.

The first phase of processing scans the selected TRQS queue and determines whether a TRQS 1508 already exists for the shared queue 106 currently being accessed. If one does not exist (the first time the shared queue 106 is being accessed in the unit of work) then one is created. The TRQS 1508 is queued at the tail of the TRQS queue.

A TROP 1510 is then obtained and queued to the TRQS 1508. There may be one or more TROPs 1510 queued to a TRQS 1508—each TROP 1510 identifies an action (put or get) issued by the UOW against the shared queue 106 represented by the TRQS 1508.

The TRQS 1508 contains control information about the shared queue 106. Some of the control information includes: (1) pointer to the first TROP 1510 queued; (2) a pointer to last TROP 1510 on the queue; (3) the structure number that the shared queue 106 maps to; (4) the list header number in the list structure 902 to which this shared queue 106 maps;

(5) the list header number assigned to this shared queue manager 108's uncommitted get queue 206; and (6) the best overall and best persistent keys (discussed below).

The TROP 1510 contains information about the operation issued. Some of the control information includes: (1) the operation: put or get; (2) the address of the next TROP 1510 (if any) on the queue of TROPs 1510; (3) the PLEID (programmable list entry ID) of the corresponding list entry, which uniquely identifies the message 204 in the CF list structure 902; and (4) the 16 byte key of the entry. This key can represent either a committed or uncommitted entry. For example, if a UOW did a get of a committed message 204, the key is a committed key. If the message 204 was put in syncpoint and not yet committed then the key is an uncommitted entry key.

Another function performed is to set up control information so that the last operation can be backed out. This is covered in the discussion of CSQE_Backout_Last_Msg.

CSQE_Delete_Thread_Info

This function is requested by a call from module CSQE-SYN1 1448, which is responsible for committing, aborting and preparing units of work. This function code instructs CSQETHDP 1450 to free all TRQS and TROP control blocks 1508 and 1510 allocated for the unit of work. This call is made from CSQESYN1 1448 after the unit of work is successfully committed, aborted or prepared.

CSQE_Backout_Last_Msg

This function, deletes the last TROP 1510 added to the last TRQS 1508 accessed by a UOW. This function is requested by CSQESYN1 1448 when it is called to backout the last message 204. This request is made in response to a successful get request and it is determined that the user-specified buffer is too small to hold the message 204 and that the caller does not accept truncated messages 204.

CSQE_Expire_Last_Msg

EXPIRY is a period of time expressed in tenths of a second, set by the application which puts the message 204. The message 204 becomes eligible to be discarded if it has not been removed from the destination queue 106 before the period of time elapses.

When CF Manager 1402 returns a message 204 to its caller in response to any one of the various types of get requests, the caller may determine that the message 204 is expired, that is, it is not to be returned to the caller. Rather it is to be moved to the getting shared queue manager 108's expiry queue (not shown).

If the last message 204 read was in response to a get request (CSQEMGE1 1422) or a get under cursor request (CSQEMGE3 1426), the corresponding TROP 1510 is removed from the TROP chain. The corresponding message 204 is moved from the shared queue manager 108's uncommitted queue to the shared queue manager 108's expiry queue. The flow of events is:
1. A data manager module 1464 determines that the message is expired.
2. Data manager 1464 calls an CSQEMEXP module 1414 (move last message to the expiry queue).
3. CSQEMEXP module 1414 (a stub module) calls a CSQEMEXP module 1416.
4. CSQEMEXP module 1416 calls CSQETHDP module 1450 with the function code CSQE_Expire_Last_Msg.
5. Upon return the from CSQETHDP module 1450, CSQEMEXP module 1416 moves the message 204 to the share queue manager 108's expiry queue CSQE_Prioritize_Last_Msg During CSQEMGE1 and CSQEMGE3 processing, a TROP 1510 is created before the message 204 is actually read. Because of this protocol, it is assumed that the priority of the message 204 to be read is 9. This causes the TROP 1510 to be queued at the end of the TROP chain. After the message 204 is read, its real priority can be determined. If its priority is different that the assumed 9, then the TROP 1510 is moved to its proper position (priority,timestamp) in the TROP queue. The function CSQE_Prioritize_Last_Msg is called from CSQEMGE1 1422 and CSQEMGE3 1426 after a message 204 is read.

Put Processing: CSQEMPU1 1420

This module is responsible for writing a message 204 to a shared queue 106. It supports the following options:
  CSQE_Put_In_SyncPoint_Persistent
  CSQE_Put_In_SyncPoint_Non_Persistent
  CSQE_Put_Out_Of_SyncPoint
In general the flow for an MQPUT request is:
MQPUT
  CSQEMPUT 1418 (stub module)
  CSQEMPU1 1420 (main service routine)
  CSQETHDP 1450: track this put operation
  Issue IXLLSTE to put the message 204 to the list header 202 assigned to the shared queue 106
  Return to the caller Input Parameters
  Parm_FRE: recovery environment
  Parm_SQToken: shared queue token. Returned on successful open
  Parm_Buffer: contains message 204 to be written
  Parm_Buffer_Length=length of message 204 to be written, rounded up to the next 256-byte multiple
  Parm_Priority: user specified priority of the message 204.
  Parm_Options:
    CSQE_Put_In_SyncPoint_Persistent,
    CSQE_Put_In_SyncPoint_Non_Persistent,
    CSQE_Put_Out_Of_SyncPoint
  Parm_Index_Key: message or correlation ID if put to an indexed shared queue 106
  Parm_Second_Locator: can be null or if Parm_Index_Key is a message ID then this value can specify a correlation ID; if Parm_Key is a correlation ID then this value can specify a message ID. MQSeries supports getting a message 204 by both message and correlation ID. A shared queue 106, when defined, is either indexed on message or correlation ID, not both.

CSQE_Put_In_SyncPoint_Persistent

Since this message 204 is in syncpoint, it is assigned an uncommitted key (a key beginning with X'F 6') so that it is placed on the uncommitted portion of the list header 202 assigned to the shared queue 106.

A call is then made to module CSQETHDP 1450 to create or add thread information. Upon return, an IXLLSTE macro instruction is issued to write the message 204 to the corresponding list header 202. If the IXLLSTE operation is successful, control returns to the caller. If the IXLLSTE operation was not successful, then a call is made to CSQETHDP 1450 to backout the last message 204, which results in the last TROP 1510 being deleted from the queue of TROPs 1510.

The fact that the message 204 is persistent is remembered in the TROP 1510. Message persistence is handled in get processing (CSQEMGE1 1422) and is addressed in more detail in that section.

CSQE_Put_In_SyncPoint_Non_Persistent

Since this message 204 is in syncpoint, it is assigned an uncommitted key (a key beginning with X'F 6') so that it is placed on the uncommitted portion 210 of the list header 202 assigned to the shared queue 106.

A call is then made to module CSQETHDP 1450 to create or add thread information. Upon return, an IXLLSTE macro instruction is issued to write the message 204 to the corresponding list header 202. If the IXLLSTE operation is successful, control returns to the caller. If the IXLLSTE operation was not successful, then a call is made to CSQETHDP 1450 to backout the last message 204, which results in the last TROP 1510 being deleted from the queue of TROPs 1510. If the queue of TROPs 1510 is empty, then the corresponding TRQS 1508 is also deleted.

The fact that the message 204 is nonpersistent is remembered in the TROP 1510. Message persistence is handled in get processing (CSQEMGE1 1422) and is addressed in more detail in that section.

CSQE_Put_Out_Of_SyncPoint

Even though this message 204 is out of syncpoint (meaning that it should be immediately visible to a get request) it is first assigned an uncommitted key and written to the uncommitted portion 210 of the corresponding put list header 202.

A call is then made to module CSQETHDP 1450 to create or add thread information. Upon return, an IXLLSTE macro instruction is issued to write the message 204 to the corresponding list header 202. If the IXLLSTE operation is successful, control returns to the caller. If the IXLLSTE operation was not successful, then a call is made to CSQETHDP 1450 to backout the last message 204, which results in the last TROP 1510 being deleted from the queue of TROPs 1510. If the queue of TROPs 1510 is empty then, the corresponding TRQS 1508 is also deleted.

If the operation is successful, control returns to the non-CF Manager caller, who then calls CSQESYN1 1448 to sync the last message 204, which causes the message 204 to be moved (by changing the entry's key to a committed key) to the committed portion 208 of the put list 202.

This two-phase process for messages 204 put out of syncpoint is done to avoid unresolvable ambiguities during queue manager recovery processing. An alternative would be to have data manager 1464 logging the put out of syncpoint before calling CSQEMPU1 1420. However, if there was a failure after CSQEMPU1 1420 was called and before it returned to data manager 1464 (e.g., the system failed), the queue manager 108, when restarting and processing its logs, could not determine if the message 204 was or was not actually written and therefore it would not know how to recover that message 204. The two-phase process described above effectively handles this situation and removes any ambiguities.

List Entry Version Numbers

To recap, any message 204 put is first put to the uncommitted portion 210 of the put list header 202. When the list entry is written it is assigned an eight-byte version number which is the UOW ID. The UOW ID is created by CSQETHDP 1450 when it encounters the first put or get (CSQE_Create_Or_Add_Thread_Info) in a UOW. The UOW ID is a one-byte numeric shared queue manager ID concatenated with the 7 high order bytes of a STCK value. Placing the shared queue manager numeric ID in the most significant position of the version number insures sysplex-wide uniqueness, as there cannot be multiple instances of the same queue manager 108 executing in the sysplex.

Buffers/Buffer Length

The buffer containing the data to be written begins on a 4K boundary. The buffer is made up of one or more 4K pages. If the message 204 to be written is less than or equal to 4096 bytes, the buffer is composed of one page. If the message 204 to be written is greater than 4096 bytes and less than or equal to 8192 bytes, the buffer is composed of two pages. The fact that the buffer always begins on a 4K boundary and is composed of a multiple 4K pages insures that XES buffer requirements are met. The buffer size and alignment requirements are discussed in the IBM publication *MVS/ESA Programming: Sysplex Services Guide*, GC28-1495-02 (June 1995) referenced above.

List Element Size

A list entry 1208 (FIG. 12) is made up of one or more list elements (LEs) 1214. The size of a list element 1214 can be one of the following: 256, 512, 1024, 2048 and 4096 bytes. In the embodiment shown, the list element size (CSQE_Element_Size) is 256. The maximum size of a list entry 1208 allowed by the disclosed coupling facility 104 is 64K. If 4K list elements 1214 are being used and a message 204 of 64K bytes is to be written, then 16 4K list elements 1214 are needed to represent the list entry 1208. If 512-byte list elements are being used then 128 512-byte list elements are required.

It is impossible to represent a 64K-byte message 204 using an element size of 256 bytes. To do so would require 256 256-byte list elements. The maximum number of elements 1214 that can comprise a list entry 1208 is 255. So if 256-byte element sizes are used the largest size message 204 that can be supported is 64K minus 256.

The number of list elements 1214 times the list element size cannot exceed 64K, so it would be an error to specify a 4K list element size and attempt to write more than 16 list elements 1214.

IXLLSTE Invocation

?IXLLSTE EntryType(New)
    AssignEntryID(pleid)
    ListNum(SCB_Put_List_Number)
    LockOper(NotHeld)
    LockIndex(SCB_Put_List_Number)
    ConToken(StrB_Connect_Token)
    AdjArea(Adjunct_Area)
    ElemNum(Parm_Buffer_Length/CSQE_Element_Size)
    Buffer(Parm_Buffer)
    BufSize(Buffer_Size)
    Assign(Key)
    EntryKey(entry_Key)
    AuthCompare(Yes)
    AuthCompType(Equal)
    AuthComp(SCB_LHQC_List_Authority)
    AnsArea(lXLLIST_Answer_Area)
    AnsLen(Length(IXLLIST_Answer_Area))
    Retcode(IXL_Ret_Code)
    RsnCode(LXL_Rsn_Code)
    VersUpdate(SET)
    NewVers(version_Number)
    Mode(SyncSuspend);
    EntryType(New): a new list entry is to be created
    AssignEntryID: CF Manager 1402 is assigned a structure-unique 12-byte PLEID to the entry 1208 to be created. (PLEID is the same as LEID in this context.) The PLEID is mapped by a CSQEPLEI module 1436. It is constructed as follows:

1-byte inverted priority (see below for a discussion on inverted priorities)

8-byte store clock (STCK) value 2-byte list header number: identifies the put list header 202

1-byte shared queue manager ID. The numeric ID of the shared queue manager 108 that put this message 204.

ListNum: the list number assigned to the shared queue 106. The assigned list number is maintained in a control block known as an SCB.

LockOper(NotHeld): this operation is to execute only when the lock on the list header 202 is not held.

Authcomp: each instance of the CF Manager 1402 in the queue-sharing group remembers the last valid list authority value it used. List authority, maintained in list controls, is increased by +1 whenever: (1) the list resident LHQC is updated; and (2) the change needs to be made visible to other shared queue managers 108 in the queue-sharing group when they next access the corresponding list header 202.

Here is an example: all shared queue managers 108 know that the valid list authority value is zero and that the shared queue 106 is not put inhibited. A shared queue manager 108 in the queue-sharing group is told to change the status of the shared queue 106 to put inhibited. That instance of the shared queue manager 108 reads the LHQC and also retrieves the current list authority. It updates its virtual storage copy of the LHQC to set the put inhibited indicator. It then attempts to rewrite the LHQC specifying what it believes to be the current list authority and requesting that if its passed list authority value matches what is in list controls that the list authority be increased by +1. (This processing occurs in an atomic fashion). Assuming that the update worked, the LHQC is updated and the list's list authority is now 1. Next another shared queue manager 108 attempts to put a message 204 believing that the current list authority is zero. Its put fails with a list authority comparison failure. This failure is returned to the caller of put processing. The error return code causes the caller to reread the LHQC (via a CSQERCAT module 1438) and it now notices that the put inhibited indicator is set and therefore fails the put request initiated by the application address space.

VersUpdate(SET): the 8-byte version number of the entry created is set to the unit of work ID.

Priority Inversion

From an external perspective, MQSeries supports priority 0 through 9. 9 is the higest priority, zero is the lowest priority. A list structure 902 orders entries by the entry key from lowest to highest (ascending order). Recall that when a message 204 is committed, the first byte of its committed key is set to its priority. If a unit of work puts 10 messages 204 to the same shared queue 106, one message 204 of each possible priority, and then commits the messages 204, the order of messages 204 would be priority zero, one, . . . nine. This would violate the MQSeries guarantee that a get gets the highest-priority message 204, because in this example the lowest-priority message 204 is at the head of the committed portion 208 of the list header 202. The entry with priority nine should be first, followed by priority 8, . . . followed by priority zero.

To address this CF Manager 1402 does priority inversion. It subtracts the priority specified on input to CSQEMPU1 1420 from 9, that is, inverted priority=(9—input priority). Hence the following mapping:

| Input Priority | Inverted Priority |
|---|---|
| 9 | 0 |
| 8 | 1 |
| 7 | 2 |
| 6 | 3 |
| 5 | 4 |
| 4 | 5 |
| 3 | 6 |
| 2 | 7 |
| 1 | 8 |
| 0 | 9 |

Indexed Queues

A shared queue 106 can be indexed by either message 204 or correlation ID. New enhancements to the architecture of coupling facility 104, described in the referenced related application, allow MQSeries to provide a robust, performance-sensitive solution for indexed queues. As described in that application, a secondary list entry key (SLEK) is maintained in the first 32-bytes of the adjunct area 1216 associated with a list entry 1208.

If a message or correlation ID was specified on the put, it is not assigned as the secondary key at put time. However, CF Manager 1402 remembers what the secondary key should be when the message 204 is committed. That is, the secondary key (if any) is assigned when the message 204 is committed.

Examining the IXLLSTE invocation above, notice that the SECONDARYKey keyword is not explicitly specified. Even though the secondary key is moved into the adjunct in CSQEMPU1 1420, this IXLLSTE invocation does not assign the secondary key to the list entry. This is because the secondary key is not 'formally' assigned until the message 204 is committed. (The operation of XES 112 is such that if the user does not specify SECONDARYKey, the secondary key is set to all zeros.) By placing it in the adjunct area 1216, CF Manager 1402 simply saves the message or correlation ID. The secondary key is assigned when the message 204 is committed. By delaying the assignment of the secondary key until commit time, CF Manager 1402 can insure that any get by message or correlation ID will not be returned an uncommitted message 204 with a matching secondary key.

So upon successful completion of the IXLLSTE invocation above, a list entry 1208 is written. Its primary key begins with X'F 6' (the uncommitted key designation) and the associated secondary key is binary zeros.

GET PROCESSING: CSQEMGE1 1422

This module is responsible for reading messages 204 from a shared queue 106. The operations that this module supports are:

CSQE_Get_Out_Of_SyncPoint
CSQE_Get_In_SyncPoint
CSQE_Get_In_SyncPoint_If_Persistent CSQEMGE1 Interface This is the interface into CSQEMGE1 1422:

Parm_FRE: recovery environment
Parm_SQToken: shared queue token. Returned on a successful open
Parm_Buffer: buffer into which the message 204 is to be read
Parm_Buffer_Length: length of the buffer. Always 64K
Parm_Options:
  CSQE_Get_Out_Of_SyncPoint
  CSQE_Get_In_SyncPoint CSQE_Get_In_SyncPoint_If_Persistent Note: each of the parm options above can be further enhanced by specifying '+CSQE_Get_With_Key'. For example: (CSQE_Get_In_SyncPoint+CSQE_Get_With_Key). When the CSQE_Get_With_Key is specified it means that a value for Parm_Index_Key (see below) has been specified.

Parm_msb_Token: mark skip backout token. Discussed in the Mark Skip Backout section of this specification.

Parm_Rollback_Count: the number of times this message 204 has been rolled back. Maximum value is 255.

Parm_Index_Key: if Parm_Input_Options is qualified with 'CSQE_Get_With_Key', then this parameter contains either a message or a correlation ID depending on how the shared queue 106 is indexed. If indexed by message ID then this parameter contains a message ID. If indexed by correlation ID then parameter contains a correlation ID.

Parm_Second_Locator: this parameter is optional. If the shared queue 106 is indexed by message ID then this parameter can be a correlation ID. If the shared queue 106 is indexed by correlation ID, this parameter can be a message ID. When a value is provided for this parameter it means that the message 204 returned must have an exact match on the input message and correlation ID.

The following sections discuss CSQEMGE1 processing with respect to nonindexed shared queues 106.

CSQE_Get_Out_Of_SyncPoint

This function code requests that the highest-priority committed message 204 (if any) be returned. An uncommitted message 204 can never be returned in response to this function code. The highest-priority message 204 is moved from the corresponding put queue 202 to the requesting shared queue manager 108's uncommitted get queue 206. A call is made to CSQETHDP 1450 to create thread-tracking information. Control then returns to data manager 1464. Two things can happen when control returns to data manager 1464:

1. The message 204 fits into the caller's buffer or it doesn't fit but the caller accepts truncated messages 204. Data manager 1464 in this case calls CSQESYN1 1448 with a request to sync the last message 204, which causes the TROP 1510 to be deleted and the message 204 on the shared queue manager 108's uncommitted get queue 206 to be deleted.

2. The message 204 does not fit into the caller's buffer and the caller does not accept truncated messages 204. Data manager 1464 in this case calls CSQESYN1 1448 with a request to back out the last message 204. In this case the TROP 1510 is removed (CSQESYN1 1448 backout last message calls CSQETHDP 1450) and the data entry is moved from the shared queue manager 108's uncommitted get queue 206 back to its proper place on the committed portion of the put list header 202 from whence it came.

The LXLLSTE invocation is as follows:

?IXLLSTE Request(Move)
   ListNum(SCB_Put_List_Number)
   MoveToList(StrB_SQM_Uncommitted_Get_List_Header)
   MoveToKey(TargetEntryKey)
   TargetKey(uncommitted_GetQ_Key)
   EntryType(Old)
   Locator(UnKeyPos)
   Direction(HeadToTail)
   KeyCompare(Yes)
   EntryKey(Key_Of_Message_To_Move)
   KeyReqType(LessOrEqual)
   AuthCompare(Yes)
   AuthComp(SCB_LHQC_List_Authority)
   AuthCompType(Equal)
   AdjArea(Adjunct)
   Action(Tail)
   Buffer(Parm_Buffer)
   BufSize(Buffer_Length)
   ConToken(StrB_Connect_Token)
   AnsArea(IXLLIST_Answer_Area)
   AnsLen(Length(IXLLIST_Answer_Area))
   Retcode(IXL_Ret_Code)
   RsnCode(IXL_Rsn_Code)
   Mode(SyncSuspend);

This IXLLSTE invocation moves the first committed message 204 (if one exists) to the getting shared queue manager 108's uncommitted get queue 206.

Key_Of_Message_To_Move is set to X'0A0000000000 . . . 00'. The above IXLLSTE invocation is telling the coupling facility 104 to look at the entry 1208 at the head of the list 1106 (Direction=HeadToTail) and to return it in the specified buffer only if its entry key is less than or equal to X'0A0000000000 . . . 00'. Since a committed message 204 has priority in the first byte of its entry key and priority is in the inclusive range (0 . . . 9) this invocation guarantees that only a committed message 204 is returned. If the first message 204 on the list was an uncommitted put (X'F 6 . . .') that message 204 would not be returned because X'F 6 . . . ' is not less than or equal to X'0A0000000000 . . . 00'.

LockOper(NotHeld): this operation is to execute only when the lock on the list header 202 is not held.

CSQE_Get_In_SyncPoint
CSQE_Get_In_SyncPoint_If_Persistent

These two functions are quite similar and are therefore covered together.

CF Manager 1402, on a shared queue by shared queue basis, keeps track of the highest-priority uncommitted message 204 put by a UOW and the highest-priority uncommitted persistent message 204 put by the unit of work. MQSeries will return an uncommitted put in response to a get request provided the UOW put the (uncommitted) message 204. That is, MQSeries will not return an uncommitted put that was put by a different UOW.

Processing is similar to what is documented in CSQE_Get_Out_Of_SyncPoint above. The most eligible message 204 is moved from the put list 202 to the shared queue manager 108's uncommitted get queue 206 and a TROP 1510 is created to track the operation. Upon return to data manager 1464, the next request that could be seen for the UOW is one of the following: (1) (2) get (in or out of syncpoint); put (in or out of syncpoint); (3) commit; (4) abort; (5) prepare; (6) sync last message; or (7) backout last message.

The difference in processing when compared to CSQE_Get_Out_Of_SyncPoint is that an uncommitted put that was put by the UOW may be returned in response to the UOW's get request. Whenever a TROP 1510 for an uncommitted put is added to a TRQS-anchored TROP chain, CSQETHDP 1450 examines all TROPs 1510 that represent uncommitted puts and calculates two values: (1) the highest-priority uncommitted put written by this UOW (ignoring the persistence attribute); and (2) the highest-priority uncommitted persistent put written by this UOW.

Here are some examples to demonstrate the concept:

EXAMPLE 1

A UOW puts 5 messages 204, M1 through M5, all of the same priority. M1 and M2 are put out of syncpoint. M3 is in syncpoint, message is nonpersistent. M4 is in syncpoint, message is persistent. M5 is put out of syncpoint. At the end of these five puts, the order of messages 204 on the list header 202 are M1, M2, M5, M3, M4, as shown in FIG. 16A. (The messages 204 put out of syncpoint are committed 'immediately').

Best overall uncommitted message is M3, best overall persistent message is M4. (Remember that message M5 was written after M3 and M4 so M5 has a later timestamp value in its key than M3 and M4). Next, 5 get in syncpoint requests are issued: order of messages 204 returned is: M1, M2, M3, M4 and M5. The UOW is returned uncommitted puts in response to its get request.

EXAMPLE 2

A UOW puts 5 messages 204, M1 through M5, all of the same priority. M1 and M2 are put out of syncpoint. M3 is in syncpoint, message is nonpersistent. M4 is in syncpoint, message is persistent. M5 is put out of syncpoint. At the end of these five puts, the order of messages 204 on the list header 202 are M1, M2, M5, M3, M4, as shown in FIG. 16A. Best overall uncommitted message is M3, best overall persistent message is M4. (Remember that message M5 was written after M3 and M4 so M5 has a later timestamp value in its key than M3 and M4). Next, 5 get requests are issued specifying get in syncpoint if persistent: order of messages 204 returned is: M1, M2, M4 and M5. M3 is NOT returned because it is nonpersistent and the get request only wants committed messages 204 or persistent uncommitted puts that it wrote returned.

EXAMPLE 3

A UOW puts 5 messages 204, M1 through M5, M1, M2, M3 and M5 each with inverted priority 9 (lowest priority). Message M4 inverted priority 0 (highest priority message). M1 and M2 are put out of syncpoint. M3 is in syncpoint, message is nonpersistent. M4 is in syncpoint, message is persistent. M5 is put out of syncpoint. At the end of these five puts, the order of messages 204 on the list header 202 are M1, M2, M5, M3, M4, as shown in FIG. 16B.

Best overall uncommitted message is M3, best overall persistent message is M4. (Remember that message M5 was written after M3 and M4 so M5 has a later timestamp value in its key than M3 and M4). Next, 5 get in syncpoint requests are issued specifying get in syncpoint: order of messages 204 returned is: M4, M1, M2, M3 and M5.

EXAMPLE 4

A UOW puts 5 messages 204, M1 through M5, M1, M2 and M5 each with inverted priority 9 (lowest priority message). Message M3 priority inverted 7. M4 inverted priority 8. M1 and M2 are put out of syncpoint. M3 is in syncpoint, message is nonpersistent. M4 is in syncpoint, message is persistent. M5 is put out of syncpoint. At the end of these five puts, the order of messages 204 on the list header 202 are M1, M2, M5, M3, M4, as shown in FIG. 16C.

Best overall uncommitted message is M3, best overall persistent message is M4. (Remember that message M5 was written after M3 and M4 so M5 has a later timestamp value in its key than M3 and M4). Next, 5 get in syncpoint requests are issued specifying get in syncpoint: order of messages 204 returned is: M3, M4, M1, M2 and M3.

The following describes how CF Manager 1402 returns the most appropriate message 204. In general, whenever a TROP 1510 is added to the TRQS-anchored TROP chain that represents a put in syncpoint nonpersistent or a put in syncpoint persistent, CF Manager 1402 calculates the best overall uncommitted message 204 and the best overall uncommitted persistent message 204. A pointer to these two TROPs 1510 (provided they exist) as well as the corresponding uncommitted key is created. The field names are:

eTRQS_Best_Overall_Key (eTRQS_Best_Overall_TROP_Address)

eTRQS_Best_Persistent_Key (eTRQS_Best_Persistent_TROP_Address)

When a TRQS 1508 is allocated (because of the first get or put for a shared queue 106) the two fields (eTRQS_Best_Overall_Key and eTRQS_Best_Persistent_Key) are initialized to CSQE_Committed_Key_Comparator (X'0A00 . . . 00'). If a best candidate uncommitted message 204 does not exist the field(s) are set to X'0A00 . . . 00'.

If the first operation for a TRQS 1508 is a get in syncpoint then the IXLLSTE invocation specifies:

?IXLLSTE Request(Move)
  EntryType(Old)
  Locator(UnKeyPos)
  Direction(HeadToTail)
  KeyCompare(Yes)
  EntryKey(Key_Of_Message_To_Move)
  KeyReqType(LessOrEqual) . . .

The value for Key_Of_Message_To_Move is set to eTRQS_Best_Overall_Key, which initially is by X'0A0000 . . . 00'. If there is a committed message 204 on the list header 202, then it will be returned because its key is guaranteed to be less than X'0A00 . . . 00'.

Now suppose that the unit of work does a put in syncpoint nonpersistent. Since this is a put in the unit of work, CF Manager 1402 calculates the message's corresponding committed key and places it in field eTRQS_Best_Overall_Key and initializes the TRQS pointer field to the address of the corresponding TROP 1510. If the unit of work does another get in syncpoint request, then the value for the variable Key_Of_Message_To_Move is set from eTRQS_Best_Overall_Key. When the IXLLSTE request executes it examines the list entry (if any) at the head of the list. If its key is less than or equal to the committed key of the best overall uncommitted message 204, then the committed message 204 at the head of the list is returned. If the list entry at the head of the list has a: key that is greater than the value specified in variable Key_Of_Message_To_Move then the move operation fails and CF Manager 1402 returns to the caller the uncommitted put that it previously wrote. The corresponding TROP 1510 is updated to indicate an operation of get (and not put since the message 204 has been read).

The same processing is performed for CSQE_Get_In_SyncPoint_If_Persistent with the exception that the value in variable eTRQS_Best_Persistent_Key is copied into field Key_Of_Message_To_Move.

Buffer Sizes

CSQEMGE1 1422 issues an IXLLSTE to move an entry from the put list header 202 to the shared queue manager 108's uncommitted get queue 206. The move request also specifies DATAOPER(Tail) so that the contents of the message 204 can be read into processor virtual storage. When the IXLLSTE Move request is issued the size of the list entry to be read is unknown.

If the message 204 to read is small (less than or equal to 4K) and CF Manager 1402 specifies a buffer greater than 4K then the move request is likely to go asynchronous. If in this case a buffer size of 4K was specified then it is highly probable that the move request would have completed synchronously. On the other hand, if MQSeries specifies a 4K buffer and the data to be read into processor storage is greater than 4K, the IXLLSTE Move request fails with a reason code that indicates that the buffer is too small to contain the list entry. In this case MQSeries needs to redrive the move operation, this time specifying a large enough buffer. In this second case, it took two access to the CF to retrieve the message data.

With this in mind, CSQEMGE1 1422 implements the following algorithm: the buffer passed to CSQEMGE1 1422 is always 64K in size. The first time MQSeries attempts to move the message 204 it specifies a buffer size of 4K on the move request. If a reason code of zero is returned, the operation is complete and control returns to the caller. If the reason code indicates that the buffer is too small then the IXLLIST request is redriven, this time specifying a buffer size of 64K. If the reason code from this request is zero, control returns to the caller. Otherwise a different type of error was encountered which CSQEMGE1 1422 then handles.

Because of the parallel nature of shared queues 106, the following could have happened: CF Manager 1402 issued the IXLLIST Move request and it failed with a reason code of buffer too small. Before we can redrive the move request with the 64K buffer another queue manager moves the message (and there are no more messages 204 on the queue) so that when MQSeries redrives the move it gets a return code back indicating no entries on the list.

GET PROCESSING—BROWSE: CSQEMGE2 1424

To "browse" a message is to use the MQGET call to copy a message without removing it from the queue. This contrasts with "getting" a message, which is using the MQGET call to remove a message from a queue.

This module is responsible for nondestructively reading messages 204 from a shared queue 106. That is, the selected message 204 is copied into a virtual storage buffer but it is not moved to the shared queue manager 108's uncommitted get queue 206

The interface into CSQEMGE2 1424 is:

Parm_FRE: recovery environment

Parm_SQToken: shared queue token. Returned on a successful open

Parm_Buffer: buffer into which the message 204 is to be read

Parm_Buffer_Length: length of the buffer. Always 64K

Parm_Token: a CF Manager generated token which identifies the message 204 returned to the caller. It is specified on browse next requests.

Parm_Options:
CSQE_Get_Browse_First
CSQE_Get_Browse_Next

Note: each of the parm options above can be further enhanced by specifying '+CSQE_Get_With_Key'. For example: (CSQE_Get_Browse_First+CSQE_Get_With_Key). When CSQE_Get_With_Key is specified it means that a value for Parm_Index_Key (see below) has been specified.

Parm_Rollback_Count: the number of times this message 204 has been rolled back. Maximum value is 255.

Parm_Index_Key: if Parm_Input_Options is qualified with 'CSQE_Get_With_Key', then this parameter contains either a message or a correlation ID depending on how the shared queue 106 is indexed. If indexed by message ID then this parameter contains a message ID. If indexed by correlation ID then parameter contains a correlation ID.

Parm_Second_Locator: this parameter is optional. If the shared queue 106 is indexed by message ID then this parameter can be a correlation ID. If the shared queue 106 is indexed by correlation ID, this parameter can be a message ID. When a value is provided for this parameter it means that the message 204 returned must have an exact match on the input message and correlation ID.

The following sections discuss CSQEMGE2 processing with respect to nonindexed shared queues 106. A subsequent section discusses the processing for indexed shared queues 106.

CSQE_Get_Browse_First

This function code requests that the highest-priority committed message 204 (if any) be returned nondestructively. An uncommitted message 204 can never be returned in response to this function code. The highest-priority message 204 is read into virtual storage if one is available. The returned list entry remains on the put 202 list available to all other types of get requests. The net is that the committed message 204 at the head of the list is returned.

The IXLLSTE Invocation is:
?IXLLSTE Request(Tail)
Entrytype(Old)
Locator(KeyPos)
Direction(HeadToTail)
Entrykey(key_To_Read)
KeyReqType(GreaterOrEqual)
Authcompare(Yes)
AuthComp(SCB_LHQC_List_Authority)
AuthCompType(Equal)
Buffer(Parm_Buffer)
BufSize(Buffer_Length)
ListNum(SCB_Put_List_Number)
ConToken(StrB _Connect_Token)
AnsArea(IXLLIST_Answer_Area)
AnsLen(Length(IXLLIST_Answer_Area))
Retcode(IXL_Ret_Code)
RsnCode(IXL_Rsn_Code)
Mode(SyncSuspend);

This IXLLSTE invocations read the first committed message 204 (if one exists) from the head of the list. EntryType (Old) says that the entry must exist; if no such entry exists the read will fail.

KeyToRead is set to X'000000000000 . . . 00'. The above IXLLSTE invocation tells the CF 104 to find the first entry on the list with a key value greater than or equal to binary zeros and to return it in the specified buffer. The above invocation may return an uncommitted message 204. When this happens the caller receives a return code indicating that no message 204 is available.

If a committed message 204 is returned, the value of Parm_Token is set to the key of the entry read. The Token is used on a browse get next call.

CSQE_Get_Browse_Next

This function code requests that the next committed message 204 with a key greater than or equal to the key of the last message 204 returned on a browse request be returned. The token that was returned on a browse first or a browse next request is passed as an input The token is the corresponding committed key of the message 204 returned in response to the get first/browse call. The low-order four bytes of the committed put key are not used and are always binary zeros. The CF Manager 1402 constructs a key in anticipation of issuing an IXLLSTE request. It takes the input Parm_Token and places X'00000001' in the low-order four bytes of the key. It then issues its IXLLSTE request asking for the next message 204 with a key greater than or equal to the newly constructed key. This invocation returns the next message 204 (if any) with a key greater than the key of the message 204 returned on the previous invocation. If an uncommitted put or the LHQC is read no message 204 is returned and the return code is set to no message available.

The IXLLSTE Invocation is:

?IXLLSTE Request(Tail)
   Entrytype(Old)
   Locator(KeyPos)
   Direction(HeadToTail)
   Entrykey(key_To_Read)
   KeyReqType(GreaterOrEqual)
   Authcompare(Yes)
   AuthComp(SCB_LHQC_List_Authority)
   AuthCompType(Equal)
   Buffer(Parm_Buffer)
   BufSize(Buffer_Length)
   ListNum(SCB_Put_List_Number)
   ConToken(StrB_Connect_Token)
   AnsArea(IXLLIST_Answer_Area)
   AnsLen(Length(lXLLIST_Answer_Area))
   Retcode(IXL_Ret_Code)
   RsnCode(IXL_Rsn_Code)
   Mode(SyncSuspend);

Get Processing—CSQEMGE3 1426: Get Under Cursor

This function code requests that CF Manager 1402 return the message 204 to which the cursor points. The cursor is initially set via get browse first and updated across get browse next requests.

The interfaces into CSQEMGE3 1426 is:

Parm_FRE: recovery environment

Parm_SQToken: shared queue token. Returned on a successful open

Parm_Buffer: buffer into which the message 204 is to be read

Parm_Buffer_Length: length of the buffer. Always 64K

Parm_Token: a required input that identifies the list entry to be returned to the caller Parm_Options:
   CSQE_Get_Msg_Under_Cursor Parm_MSB_Token: mark skip backout token. Discussed in the Mark Skip Backout section of this specification.

Parm_Rollback_Count: the number of times this message 204 has been rolled back. Maximum value is 255.

CSQE_Get_Msg_Under_Cursor

This function code requests that CF Manager 1402 return the message 204 to which the cursor points. The cursor is initially set via get browse first and updated across get browse next requests.

The message 204 to which the cursor points to may no-longer exist. Since browse requests are nondestructive another get request (CSQEMGE1 1422) or get under cursor request (CSQEMGE3 1426) may already have read the message 204.

The IXLLSTE invocation is:

? IXLLSTE Request(Move)
   Entrytype(Old)
   Keytype(Entry)
   Locator(KeyPos)
   KeyReqType(Equal)
   Authcompare(Yes)
   AuthComp(SCB_LHQC_List_Authority)
   AuthCompType(Equal)
   EntryKey(Parm_Token)
   Action(Read)
   Buffer(Parm_Buffer)
   BufSize(Parm_Buffer_Length)
   MoveToList(StrB_SQM_Uncommitted_Get_List_Header)
   ListNum(SCB_Put_List_Number)
   MoveToKey(TargetEntryKey)
   TargetKey(uncommitted_GetQ_Key)
   ConToken(StrB_Connect_Token)
   AnsArea(IXLLIST_Answer_Area)
   AnsLen(Length(IXLLIST_Answer_Area))

This IXLLSTE invocation read the first committed message 204 (if one exists) from the head of the list. EntryType (Old) says that the entry must exist, if no such entry exists: the read will fail.

Key_To_Read is set to X'000000000000 . . . 00'. The above IXLLSTE invocation is telling the CF to find the first entry on the list with a key value greater than or equal to binary zeros and to return it in the specified buffer. The above invocation may return an uncommitted message 204. When this happens the caller receives a return code indicating that no message 204 is available.

If a committed message 204 is returned, the value of Parm_Token is set to the key of the entry read. The Token is used on a browse get next call.

Get/Wait Processing

A request to read a committed put may fail because a committed message 204 that meets caller requirements does not exist. For example: (1) request to get a message 204 from a nonindexed queue and no committed messages 204 exist; (2) a request to get a message 204 by message ID or correlation ID from an indexed shared queue 106 and no committed message 204 with the corresponding message ID or correlation ID exists; or (3) a request to get a message 204 by both message ID and correlation ID and no committed message 204 with a matching message ID and correlation ID exists In these cases CF Manager 1402 returns a return code indicating that no entry is available. Data manager 1464 upon receipt of this return code calls a CSQEBMO1 module 1406 (the stub module is CSQEBMON module 1404— begin monitoring) to request either list transition or sublist monitoring support.

CSQEBMON 1404/CSQEBMO1 1406

This is the interface into CSQEBM01:

csFRE: recovery environment csSQToken: shared queue token. Returned on a successful open. Identifies a shared queued. 1Monitoring_Type: type of monitoring requested:
   CSQE_GetWaitRequest
   CSQE_TriggerRequest
   CSQE_SetTriggerRequestBitOnly
   CSQE_GetWaitSpecificRequest 1Monitoring_Priority: priority to be monitored Monitor_Key: key to be monitored 1Monitoring_Depth: queue depth 1Caller: identifies the caller of the begin monitoring service 1RetCode: return code 1RsnCode: reason code This section describes the processing that is done for CSQE_GetWaitRequest and CSQE_GetWaitSpecificRequest.

List Transition Vectors

A list transition vector is a set of bits, a multiple of 32 bits, in processor storage in the processor where the shared queue manager is executing. XES 112 provides interfaces that allows the CF Manager 1402 to associate a list header 1106 in a list structure 902 with a specific vector bit. For simplicity, CF Manager 1402 (within a list structure 902) associates list header 1 (shared queue 1) with vector bit 1, list header 2 (shared queue 2) with vector bit 2, . . . list header 512 with vector bit 512. If the CF Manager 1402 is monitoring list header 1 for transitions from empty to not-empty transitions across the monitored committed range, then when an eligible message 204 arrives, XES 112 turns on the vector bit that corresponds to the list header that just transitioned and drives a list transition exit of the monitoring shared queue manager 108. Both lists and key ranges within lists can be monitored for such transitions.

Nonindexed Queues

This section details the processing performed when CF Manager 1402 indicates to its caller that no committed message 204 (on a nonindexed shared queue 106) exists. The application specifies that if no committed message 204, exists then it is to be suspended until a committed message 204 can be returned.

Data manager 1464 calls CSQEBMO1 1406 with the request CSQE_GetWaitRequest. This instructs CF Manager 1402 to monitor the committed key range 208 of the put list header 202 for transitions from the empty to the not-empty state.

Let's analyze the IXLLSTC request that is used to begin the key range monitoring:

?IXLLSTC Request(Monitor_KeyRange)
  ListNum(SCB_Put_List_Number)
  Action(Start)
  Vectorindex(SCB_Put_List_Number)
  DriveExit(Yes)
  ConToken(StrB_Connect_Token)
  AnsArea(IXL_Answer_Area)
  AnsLen(Length(IXL_Answer_Area))
  Retcode(IXL_Ret_Code)
  RsnCode(IXL_Rsn_Code)
  Mode(SyncSuspend);

The ability to monitor a key range is new architected function provided in coupling facility 104, as described in the referenced related application.

Monitor_Keyrange requests that key range monitoring of the list specified by the ListNum keyword be started for a particular key range that has previously been defined.

As for where the key range gets initialized, during open shared queue processing, a CSQEOPEN 1432 module calls a CSQESLCT module 1444 (set list controls). Here is the IXLLSTC invocation in, module CSQESLCT 1444:

?IXLLSTC Request(WRITE_LCONTROLS)
  ConToken(Parm_ConToken)
  ListNum(Parm_List_Header)
  AuthComp(Current_List_Authority)
  NewAuth(New_Authority_Value)
  KeyRange(SET)
  KeyRangeStart(CSQE_Key_All_zeroes)
  KeyRangeEnd(Key_Range_End)
  KeyRangeSTATE(DEFINE)
  KREmpty(TrigDepth)
  KRNotEmpty(TrigDepth)
  Mode(SyncSuspend)
  AnsArea(IXL_Answer_Area)
  AnsLen(length(IXL_Answer_Area))
  RetCode(IXL_Ret_Code)
  RsnCode(IXL_Rsn_Code);

Assuming that the values of the keywords associated with triggering are set to the MQSeries default, then:

1. KeyRange(SET) indicates that a key range value is specified. The beginning of the key range is defined by the keyword KeyRangeStart. The end of the key range is specified by the keyword KeyRangeEnd.

Assuming that the default triggering criteria is specified for the shared queue 106, then the value of variable Key_Range_End is X'09FFFF . . . FF'. Therefore the key range is (X'0000 . . . 00', X'09FF . . . FF'). This key range defines the committed portion of the put list.

2. The next set of keywords, KREmpty and KRNotEmpty, specify when the CF considers the monitored key range empty and not-empty. This controls when XES; 112 reports list transitions from the empty to the not-empty state.

The default value for TrigDpth is 1. The code in CSQESLCT 1444 subtracts 1 from the TrigDpth specification. Hence the value for KREmpty and KRNotEmpty is 0 assuming that the default TrigDpth value of 1 is not overridden for the shared queue 106. KREmpty(0) says that the monitored key range is considered empty when there are zero entries in the monitored range. KRNotEmpty(0) says that the monitored key range is considered not empty when there are more than zero list entries on the list with an entry key within the monitored range.

The IXLLSTC invocation above simply initiates list transition monitoring. Using the assumptions above and further assuming that the committed key range of the put list header 202 is empty, then when the first message 204 appears within the committed range 208 (either because an uncommitted put is committed or an uncommitted get of a committed put is backed out) the associated CF Manager 1402's list transition exit is scheduled. Upon notification of the list transition, data manager 1464 is informed that it can redrive pending get waits that are suspended waiting for a committed message 204 to appear on the committed portion of the list header 202.

Of course, if there are multiple get waiters and one message 204 materializes, it is unpredictable which get waiter actually retrieves the committed message 204. Several sharing queue managers 108 can thus share their work.

Indexed Queues

A request can be made for a message 204 with a specific message or correlation ID. A shared queue 106 can be indexed by either message ID or correlation ID and not both. As discussed earlier, a message's secondary key (representing the message ID or correlation ID) is not assigned until the message 204 is committed.

When a Get Wait request is made specifying a message or correlation ID, CF Manager 1402 attempts to find a list entry with the corresponding secondary key. If no message 204 with the specified secondary key is found, a return code is set indicating no entry available.

Upon receipt of this return code, data manager 1464 calls CSQEBMO1 1406 with a function code specifying CSQE_GetWaitSpecificRequest. Note that monitoring on the committed key range (described above) only informs us that a committed message 204 has arrived with a key in the key range and provides no indication when a message 204 with a specific (entry or secondary) key arrives on the list.

So in response to CSQE_GetWaitSpecificRequest, CF Manager 1402 initiates sublist monitoring. A sublist is a set of zero or more entries that share the same entry Dr secondary key. XES 112 provides an interface in which CF Manager 1402 can be informed when the first message 204 with a user-specified entry or secondary key first appears on the monitored list. When a message 204 with the specified key is placed into the list, an EMC 1306 is queued to the monitoring shared queue manager 108's event queue 1116, the corresponding list transition vector bit is set on and then the shared queue manager 108's list transition exit scheduled.

Here is the monitor sublist invocation specified by CF Manager 1402:

```
?IXLLSTC Request(Monitor_SUBLIST)
   ListNum(SCB_Put_List_Number)
   Secondarykey(Secondary_Key)
   Notification(Every)
   Action(Start)
   UNC(UNC)
   ConToken(StrB_Connect_Token)
   AnsArea(IXL_Answer_Area)
   AnsLen(Length(IXL_Answer_Area))
   Retcode(IXL_Ret_Code),
   RsnCode(IXL_Rsn_Code)
   Mode(SyncSuspend);
```

Before analyzing the above invocation, a few other explanations are needed.

Each connection to a list structure 902 is assigned its own event queue 1116. That is, there is one event queue 1116 per list structure connection. In the disclosed embodiment, there are two such event queues: one for primary key events, the other for secondary key events. Either or both can be used or monitored.

When a list entry 1208 with a key appears on a list that is being monitored, an Event Monitor Control (EMC) entry 1306 is queued to the monitoring queue manager(s) event queue 1116 and the bit in the list transition exit that corresponds to the event queue 1116 is set on. Then the connection's list transition exit is invoked.

CF Manager 1402 assigns a vector bit to the event queue 1116. Bit CSQE_Monitor_EventQ_VectorBit (whose value is zero) is assigned to the event queue 1116. When a list entry with a monitored key appears on the monitored list, an EMC 1306 is queued to the monitoring shared queue manager 108's event queue 1116 and bit CSQE_Monitor_EventQ_VectorBit is turned on and the corresponding list transition exit is scheduled.

Before CF Manager 1402 can monitor a sublist (or a set of sublists) it tells XES 112 that it wants to monitor its event queue 1116 and what bit it has assigned for the event queue 1116. This processing is done in a CSQECONN module 1408. The invocation is:

```
?IXLLIST Request(Monitor_EventQ)
   Action(Start)
   VectorIndex(CSQE_Monitor_EventQ_VectorBit)
   DriveExit(Yes)
   ConToken(StrB_Connect_Token)
   AnsArea(IXLLIST_Answer_Area)
   AnsLen(length(IXLLIST_Answer_Area))
   Mode(SyncSuspend)
   RetCode(IXLLIST_Ret_Code)
   RsnCode(IXLLIST_Rsn_Code)
```

Now back to the Monitor_Subist invocation described above. UNC stands for User Notification Controls. CF Manager 1402's use of this field is mapped by a CSQEUNC module 1458. This 16-byte value is included in the EMC 1306 that is queued to the shared queue manager 108's event queue 1116. When CF Manager 1402 recognizes that its event queue 1116 has transitioned, it issues an IXLLSTC Request(DEQ_EVENTQ) macro to retrieve the queued EMC 1306 into virtual storage. One of the component fields in the EMC 1306 is the UNC value that was specified when sublist monitoring was initiated.

The control information in UNC helps CF Manager 1402 to identify the reason why the EMC 1306 was queued (CSQE_Identifier), the structure and list header with structure that the EMC 1306 is for, the Data Manager Token associated with the shared queue 106 and the shared queue token which identifies the shared queue 106.

CF Manager 1402 then calls a CSQEMLTRX module 1428 to inform it of the transition passing on the call the following data:

DMC token: so DMC can locate its control structure
The secondary key that the EMC 1306 identifies
Other control information
Synchronization Services: CSQESYN1 1448

This program is responsible for committing, aborting or preparing a unit of work.

This is the interface into CSQESYN1 1448:
Parm_FRE: recovery environment
Parm_Token: mark skip backout token
Parm_Options:
   CSQE_Commit_UOW_Begin
   CSQE_Commit_UOW
   CSQE_Abort_UOW
   CSQE_Prepare=UOW
   CSQE_Sync_Last_Message
   CSQE_Backout_Last_Msg
   CSQE_Mark_Skip_Backout Committing a UOW: Commit UOW Begin and Commit UOW The commit of a unit of work is a two-phase process. The first phase of commit is CSQE_Commit_UOW_Begin. When CSQESYN1 1448 receives this directive it marks the thread block 1500 (FIG. 15) to indicate 'in commit' and then calls CSQEWUOW 1462 to write one or more UOW descriptors (eUOWDs) 1700 (FIG. 17) described below to the shared queue manager 108's UOW list header, which resides in the queue-sharing group's administrative structure. The thread block structure 1500 indicates that the UOW is in begin commit state. In the thread block structure 1500 is maintained state information. Before setting the begin commit indicator in the thread block 1500, a check is made to insure that the value of ethr_State 1506 is binary zeros. If not binary zeros, an abend is issued (CSQE_Inconsistent_Thread_State). After writing the UOW descriptors 1700 control returns to the caller.

Data manager 1464 then calls CSQESYN1 1448 again, this time specifying a function code of CSQE_Commit_UOW, which initiates phase 2 of commit processing. A call is made to CSQEWUOW 1462 to change the status of the unit of work from 'begin commit' to 'in commit'. (The processing that occurs in CSQEWUOW 1462 is documented in the section devoted to CSQEWUOW 1462). This phase of commit processes the TRQSes 1508 from left to right. Queue 1 is committed first, followed then by queue 2 and then by queue 3 in structure 1. For each TRQS 1508 processed, the corresponding queue of TROPs 1510 are processed in priority/time sequence order. The thread block structure array entries 1502 are processed from entry 1 to 255. That is, after the TRQSes 1508 and TROPs 1510 for structure 1 are processed, structure 2 is processed, then structure 3, . . . then structure 255. In other words, commit processing is done a structure 902 at a time beginning with structure 1 and finishing with structure 255.

If the TROP 1510 represents a get request, the list entry 204 is deleted from th(e shared queue manager 108's uncommitted get queue 206. The information needed to delete the list entry 204 is in the TRQS 1508 and the TROP 1510.

If the TROP 1510 represents a put request, the list entry 204 is moved from the uncommitted portion 210 of the put list header 202 to the committed portion 208, that is, the entry's key is changed from a uncommitted to a committed key. The information needed to move the list entry is in the TRQS 1508 and the TROP 1510. If the put specified a secondary key (i.e., the TRQS 1508 indicates that the shared queue 106 is indexed), then the secondary key is assigned as part of the move from the uncommitted portion 210 to a committed portion 208 of the PLH 202.

Note: An uncommitted put written by a UOW may have been returned to the UOW in response to a get request. In that case, the original TROP 1510 (representing the put) is updated in place to indicate that it now represents a get request. After the put is turned into a get the next function code that CSQESYN1 1448 might see for the UOW is to backout the last message 204 because it would not fit into the caller's buffer and the caller does not accept truncated messages 204. In this case, the TROP 1510 is again updated in place to indicate that it now represents a put request.

After this second phase of commit processing is complete, module CSQEWUOW 1462 is called and told to delete the UOW descriptors 1700 for this UOW, and then CSQETHDP 1450 is called to collapse the thread-tracking structure: that is, to delete all the TRQSes 1508 and TROPs 1510.

When phase 2 commit begins, CSQESYN1 1448 first checks to see if the ethr_State 1506 is in prepare. If it is in prepare state, a call is made to CSQEWUOW 1462 to change the state in the UOW descriptor 1700 from 'in prepare' to 'committed'.

More Detail: Commit processing obtains two buffers: one is used to specify the set of messages 204 to be deleted. Gets that are committed are deleted. The other buffer is used to specify the set of messages 204 to be moved. Uncommitted puts that are committed are moved from the uncommitted portion 210 to the committed portion 208 of the put list header 202. Commit processing processes one TRQS 1508 at a time. This means that the move or delete buffers only contain data that map to a particular shared queue 106 as represented by a TRQS 1508. With respect to committing puts, there are two choices of move interface to use:

If the shared queue 106 represented by the TRQS 1508 is not an indexed queue, then the uncommitted puts need to be moved from the uncommitted portion 210 to the committed portion 208 of the PLH 202 by being given its corresponding committed key. An IXLLSTM Request(Move_EntryList) is issued. The buffer is mapped by IXLYMELI2 (MELI= Move_EntryList). The MELI2 interface allows a set of entries to be specified by their corresponding PLEID. For each vector entry, the new key to be assigned to the entry that is being moved is specified (MELI2_Target_Key).

If the shared queue 106 represented by the TRQS 1508 is an indexed queue, then the uncommitted puts need to be moved from the uncommitted portion 210 to the committed portion 208 of the list header 202 by being given its corresponding committed entry key and its secondary key must also be assigned. In this case, the buffer specified on the IXLLSTM Request(Move_EntryList) is mapped by IXLYMELI3. This mapping of the buffer allows CF Manager 1402 to specify the entry's secondary key as well as its committed entry key.

(XES 112 determines if the buffer is mapped by MELI2 or MELI3 as follows: MELI2: MoveToKey(TargetKey) and MoveToSKey(Unchanged) specified/defaulted. MELI3: MoveToSKey(TargetKey) specified. A MELI1 interface is supported which CF Manager 1402 does not use in CSQE-SYN1 1448. MELI1 allows the movement of an entry between lists without changing its entry key. That is MoveToKey(Unchanged) and MoveToSKey(Unchanged).)

With respect to committing uncommitted gets, the list entries are deleted. CSQESYN1 1448 uses the IXLSTMRequest(Delete_EntryList) interface, which allows the specification of a set of PLEIDs that represent the list entries to be deleted. The buffer specified on the Delete_EntryList request is mapped by IXLYDELI2 (in which DELI signifies Delete_EntryList).

The call to move or delete the list of PLEIDs may time out before all entries in the buffer are processed. CSQESYN1 1448 handles this return code and when received redrives the request specifying the first unprocessed entry, within the Move_EntryList or Delete_EntryList, in the buffer.

Aborting a UOW

Aborting a UOW is a one-phase process, that is, there are not two calls from data manager 1464 as there are for the commit case documented above. CSQESYN1 1448 first checks to see if the ethr_State 1506 is in prepare. If it is in prepare state, a call is made to CSQEWUOW 1462 to change the state in the UOW state from 'in prepare' to 'abort'. Otherwise, CSQEWUOW 1462 is called to write one or more eUOWDs 1700 for the unit of work to be aborted. CSQEWUOW 1462 indicates that the UOW is in abort.

Aborting a unit of work is very similar to the commit processing in that Delete_EntryList and Move_EntryList buffers are obtained. A major difference is that uncommitted puts are deleted and uncommitted gets are moved back to the list header 202 from which they came.

After abort processing is complete, module CSQEWUOW 1462 is called and told to delete the UOW descriptors 1700 for this UOW and then CSQETHDP 1450 is called to tear down the thread tracking-structure: that is, to delete all the TRQSes 1508 and TROPs 1510.

Backout Last Message

When this routine is invoked one of the following operations were requested immediately prior to this backout last message call:

a get in syncpoint a get out of sync point

In either case, it is determined that the message 204 will not fit into the user's supplied buffer and the user does not accept truncated messages 204. If the TROP 1510 represents a committed put that was returned to the previous get request, the list entry is moved back to the put queue and the TROP 15 is deleted. If the TROP 1510 represents an uncommitted put that was returned to the previous get request then the TROP 1510 is updated in place to look again like a put.

The request to backout the last message 204 is assumed to immediately follow the get of the message 204. This means that there are no intervening requests for the UOW between the get and the backout last message call.

Prepare

Preparing a UOW is a one-phase process. CSQESYN1 1448 first checks to see if the ethr_State 1506 is in any state other than the null state. If ethr_State 1506 is nonzero then the request to prepare is abended.

Prepare then calls CSQEWUOW 1462 to write the UOW descriptors 1700 and to indicate that the UOW is prepared. The next request expected to be seen for the UOW is either commit UOW or abort UOW.

Mark Skip BackOut

Mark Skip Backout support allows an application to identify a single message 204 it has read within a UOW to not be a participant in UOW backout (abort) processing.

For example, if a unit of work read 5 messages 204, M1 through M5, it could identify message M1 as 'mark skip backout'. If the UOW requests a backout (abort), then messages M2 through M5 are moved backed to the put list headers 202 from which they came while message M1 remains on the shared queue manager 108's uncommitted get queue 206. Message M1 is now in a UOW which will eventually be aborted or committed. Only one message 204 read in a UOW can be marked 'skip backout'. CF Manager 1402 supports this semantic for shared queues 106.

The intent is that the message 204 remaining on the shared queue manager 108's uncommitted get queue 206 (M1 in the example scenario above) is committed, which means it is deleted.

CSQESYN1 1448 insures that the mark skip backout token (Parm_Token) passed on input is valid. The token, 8 bytes in length, is composed of a four-byte TRQS address and a four-byte TROP address. If then insures that the corresponding TROP 1510 does in fact represent a get operation. It also insures that this is the first request to mark a get as mark skip backout. One and only one get within a unit of work can be so marked. Any attempt to mark more than one get as mark skip backout results in an abend being issued.

The next section of this document discusses the CF Manager implementation of the mark skip backout function.

List Limit Override

MQSeries provides facilities to limit the number of messages 204 on a local queue. If the limit is specified as N then there cannot be more than N messages 204 on the queue.

This concept is carried over to shared queues 106. When a limit of N is specified for a shared queue 106, it means that there cannot be more than N committed and uncommitted puts on the corresponding list header 202. The number of list entries that can be on a list is specified in the associated list controls and is updated via the IXLLSTC service. Its value is changed whenever a command is issued that changes queue depth. Let's look at some examples.

Assume that queue depth is specified as 10 and that the initial state of the list is empty.

A unit of work puts 10 messages 204 and they are initially in the uncommitted state. If the UOW attempts to put the eleventh message 204, the CF prohibits it and CF Manager 1402 receives a list full return/reason code. This error condition is returned to the caller.

Assume that there are 10 messages 204 (either committed or uncommitted, it does not matter) on the put list header 202 and the list limit (queue depth) is set to 10. While in this state, a command is issued that changes the queue depth to 5. The change is accepted and list controls is updated to indicate a list limit of 5. The 10 messages 204 that are already resident on the list remain on the list. Any subsequent put while there are more than 5 messages 204 on the queue are rejected with the list full return/reason code.

The queue depth specified for a shared queue 106 is modified by the CF Manager 1402 because there is another control entry that resides on the put list header 202, namely the LHQC. So if an installation requests a queue depth of 10, CF Manager 1402 actually puts the value 11 in list controls to take into account the existence of the LHQC.

Let us examine another scenario: queue depth is set to 10. There are 10 committed messages 204 on the put list header 202. A unit of work reads 5 of the messages 204 and has not yet committed or aborted. There are 5 messages 204 on the put list header 202, 5 messages 204 on the shared queue manager 108's uncommitted get queue 206. Another unit of work writes an additional 5 messages 204 so that there are now 10 messages 204 on the put list header 202. Next the unit of work that did the 5 gets decides to abort (backout). As described in other parts of this document, the backout process moves the messages 204 previously read back to the put list header 202 from whence they came. Since there are already 10 messages 204 on the put list header 202, the attempt to move the 5 gets back to the put list header 202 will fail with return/reason code list full. However, MQSeries must be able to move the messages 204 back regardless of the queue depth setting of the target list header 202.

This could be solve programmatically: CF Manager 1402 could temporarily increase the list limit, perform the move operations, and then reset the list limit back to what it should be. This would be extremely complex to implement because:

The shared queue manager 108 can fail after temporarily increasing the queue depth but before it resets it to its proper value. Restart/Peer Level Recovery would need to be able to recognize and correct this situation.

New puts to the put list header 202 need to be inhibited during the time interval that the list limit has been temporarily increased. Restart/Peer Level Recovery would need to reset the list limit and uninhibit subsequent put requests.

In support of shared queues 106, the CF Architecture was extended to indicate on particular move operations that the list limit specification for the list is to be ignored. Hence when the CF Manager 1402 aborts gets, it specifies that the list limit of the list to which the entries are being moved back is to be ignored. The extension of the architecture allows the list limit to be ignored but does not allow the entry's data to be changed. That is, it is not possible for the CF Manager 1402 to say move an entry from one list header to another ignoring list limit on the target list and modify the entry data.

There are two other cases where the CF Manager 1402 requests that target list limits be ignored when moving list entries:

1 When moving within the same list (target list=source list) the LHQC (catalog entry). As discussed previously, some changes to the LHQC need to be broadcast as soon as they are made. CF Manager 1402 does this by changing the data in the LHQC and changing its key. (The key of the LHQC can transition between the following values: X'FFF . . . FF', X'FFFF . . . FE' and X'FFFF . . . FD').

This broadcast operation is attempted by doing a move and data update operation (in one XES 112 call). All instances of the CF Manager 1402 in the Queue-sharing Group are monitoring sublist transitions for X'FFFF . . . FF' and X'FFFF . . . FE'). However, if the list is at or above its list limit then the move operation fails because list limits are ignored only when changing an entry's key.

When a list full occurs in this situation, CF Manager 1402 does the following:

Updates the LHQC in place. XES made changes for MQSeries that insures that a list or structure full is not reported when updating an already existing entry.

After successfully updating the LHQC, it is moved to its new key and the list limit override function is requested.

Of course CF Manager 1402 could fail after updating the LHQC but before moving it to its new key. Restart/Peer Level Recovery handle this situation by unconditionally moving it to its other key, either X'FFFF . . . FF' or X'FFFF . . . FE').

2. When committing uncommitted puts. The commit process encompasses the movement of one or more list entries from the uncommitted portion to the committed portion of the put list header 202.

Rollback Counts

CF Manager 1402 keeps track the number of times a message 204 that has been read (moved from the put list header 202 to a shared queue manager 108's uncommitted queue) has been rolled back (i.e., moved back to the put list header 202 from whence it came). This maps the same semantics that are supported for local queues to a shared queue environment. CF Manager 1402 caps the rollback count at 255 to be consistent with local queues.

Each list entry has an associated 8-byte version number. When a list entry is created (put processing) the entry's version number is set to zero. Whenever a message 204 is moved from the shared queue manager 108's uncommitted get list header 206 back to the put list header 202 from whence it came, its version number is increased by 1. Whenever a message 204 is read, (CSQEMGE1 1422, CSQEMGE2 1424 and CSQEMGE3 1426) its version number is captured and the rollback count (up to a maximum value of 255) is returned to the caller across the interface.

CSQEWUOW 1462: Write UOW Descriptors

This module is responsible for writing UOW descriptors 1700 to a shared queue manager 108's UOW list header in the administrative structure. A unit of work descriptor is mapped by CSQEUOWD.

Figure 17:
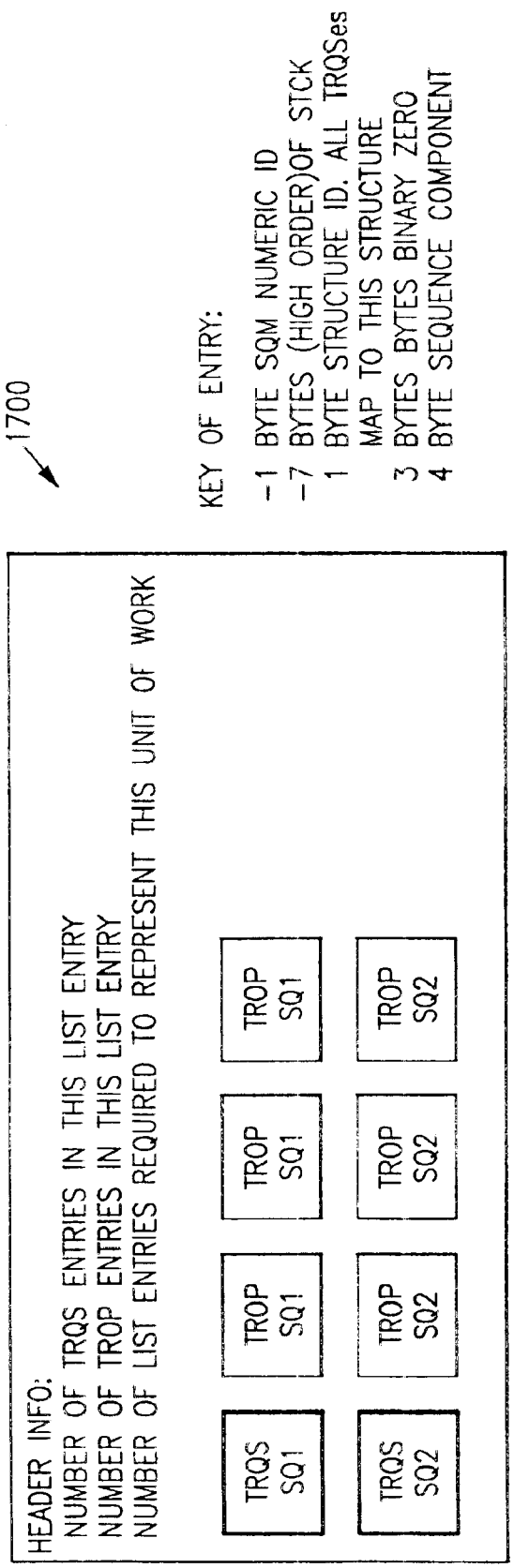
FIG. 17 shows a unit of work (UOW) descriptor.

The interface into CSQEWUOW 1462 is:

Parm_FRE: recovery environment
Parm_Options:
  CSQE_Commit_UOW_Begin
  CSQE_Prepare_UOW
  CSQE_Commit_UOW_End
  CSQE_Prepare_To_Commit
  CSQE_Prepare_To_Abort
  CSQE_Abort_UOW
  CSQE_Delete_Admin_Table_Entries_For_UOW CSQEWUOW 1462 is responsible for writing UOW descriptors (eUOWDs) 1700 for a unit of work when the UOW commits, aborts or prepares. A unit of work descriptor is 4K bytes in size and contains key information needed for shared queue manager 108 restart and peer recovery. eUOWDs 1700 allow a peer connection to forward complete a UOW marked 'in commit' or 'abort'. The UOW descriptor 1700 contains a subset of information from TRQSes 1508 and TROPs 1510. A UOW descriptor 1700 is shown in FIG. 17.

If a unit of work accessed queues in two structures 902, then a minimum of two UOW descriptors 1700 are written. The first UOW descriptor 1700 represents the shared queues 106 accessed (and their associated operations) in structure 1, the second UOW descriptor 1700 represents the same information but as it relates to structure 2.

Based on the number of shared queues 106 accessed in a unit of work as well as the number of operations issued, it may not be possible to store all information in a single UOW list descriptor.

Support is provided for writing multiple UOW descriptors 1700 per list structure 902 accessed in the unit of work. The last four bytes of the UOW descriptor 1700 are a sequence component. The first entry begins with sequence number zero.

Assume a UOW commits after having accessed shared queues 106 in two different structures 902. Two UOW descriptors 1700 need to be written for list structure 1, and two UOW descriptors 1700 need to be written for structure 2 for the UOW, the four keys (in sequence) are:

01xxxxxxxxxxxxxxxx0000000000000000
01xxxxxxxxxxxxxxxx0000000000000001
02xxxxxxxxxxxxxxxx0000000000000000
02xxxxxxxxcxxxxxxxx0000000000000001

The first byte of the key identifies the list structure 902. The TRQSes 1508 and TROPs 1510 in the eUOWD 1700 all reference the same list structure 902. XXXXXXXXXXXXXXXX represents the unit of work ID. The next three bytes are always binary zero. The final four bytes are a sequence number component. For structure 1 and 2 above, there is part 0 of 1 and part 1 of 1. Information in the first eUOWD 1700 written for a structure 902 indicates how many parts (eUOWDs) were written for the unit of work. Recovery processing can then determine if only a partial set of eUOWDs 1700 were written for a UOW/Structure. This would occur when the shared queue manager 108 that is writing the eUOWDs 1700 fails before they are all written.

The eUOWD list entry key field is mapped by a CSQEUOWK module 1460.

Before a UOW descriptor 1700 can be written, CSQEWUOW 1462 first needs to determine how many 4K list entries are needed. This is so that it can initialize the 'number of list entries' field in the header of the first UOW descriptor 1700.

It then flattens key information from the TRQSes 1508 and TROPs 1510 (as detailed in FIG. 17) and then writes the UOW descriptor 1700. If multiple UOW descriptors 1700 need to be written, UOW descriptor sequence zero is written first, followed by UOW descriptor sequence 2, and so forth. The UOW descriptors 1700 are in key sequence by numeric structure ID on the shared queue manager 108's eUOWD list header.

If a unit of work has accessed only one structure 902 then the status of the unit of work is represented in the adjunct area of the first eUOWD written for a structure 902. The processing is different for a unit of work that has accessed multiple structures 902. The processing that is done in that case is discussed in "Multi Structure Units of Work" below. The next few sections assume that the UOW has accessed only one list structure 902.

Commit UOW Begin

This code writes the UOW descriptors 1700. Control block structure maintained by CSQETHDP 1450 persists (TRQSes 1508 and TROPs 1510). eUOWD adjunct indicates begin commit. ETHR_STATE 1506 indicates begin commit. Control then returns to the caller.

Commit UOW End

This code gets control from CSQESYN1 1448 when it is told to CSQE_Commit_UOW. eUOWD adjunct indicates in commit. When the commit process is completed, there is another call to CSQEWUOW 1462 from CSQESYN1 1448 this time requesting CSQE_Delete_Admin_Table_Entries at which point the UOW descriptors 1700 are deleted from the administrative structure.

Prepare UOW

This code writes the UOW descriptors 1700. In the adjunct of the first UOW descriptor 1700, the status indicated is 'in prepare'. Control block structure maintained by CSQETHDP 1450 persists (TRQSes 1508 and TROPs 1510). ETHR_STATE 1506 indicates begin commit. Control then returns to the caller.

Prepare to Commit

This code gets control when it CSQESYN1 1448 is told to commit a UOW that has been previously prepared, hence the transition from prepared state to commit state. The adjunct area is changed to indicate that the UOW is in commit. The adjunct area is updated and control returns to CSQESYN1 1448, which then commits the UOW. When the commit process is completed, there is another call to CSQEWUOW 1462 from CSQESYN1 1448 this time requesting CSQE_Delete_Admin_Table_Entries at which point the UOW descriptors 1700 are deleted from the administrative structure.

Prepare to Abort

This code gets control when it CSQESYN1 1448 is told to abort a UOW that has been previously prepared, hence the transition from prepared state to abort state. The adjunct area is changed to indicate that the UOW is in abort. The adjunct area is updated and control returns to CSQESYN1 1448, which then aborts the UOW. When the abort process is completed, there is another call to CSQEWUOW 1462 this time requesting CSQE_Delete_Admin_Table_Entries at which point the UOW descriptors 1700 are deleted from the administrative structure.

Abort UOW

This code gets control from CSQESYN1 11448 when it is told to CSQE_Abort_UOW. The adjunct area is changed to indicate that the UOW is in abort. The adjunct area is updated and control returns to CSQESYN1 1448, which then aborts the UOW. When the abort process is completed, there is another call to CSQEWUOW 1462 this time requesting CSQE_Delete_Admin_Table_Entries at which point the UOW descriptors 1700 are deleted from the administrative structure.

Delete Administrative Table Entries

This code simply deleted the UOW descriptors 1700 from the administrative table for the now complete UOW. If more than one UOW descriptor 1700 was written for the UOW, they are deleted in LIFO order.

Multi Structure Units of Work

A unit of work can access multiple application list structures 902. This occurs when the set of queues accessed by a unit of work do not all map to the same CF list structure 902. Consider the following example: Shared Queue (SQ) A maps to STR1, SQ B maps to STR2 and SQ C maps to STR C. A unit of work opens SQ A, SQ B and SQ C and does a put to each shared queue 106.

When a unit of work reaches a syncpoint, eUOWDs 1700 are written that detail the shared queues 106 accessed and the operations performed against those queues by the unit of work. This is performed by module CSQEWUOW 1462. At least one eUOWD 1700 is written for each structure 902 accessed by the unit of work. An eUOWD 1700 is currently 4096 bytes in size. It may not be possible to represent all the queues and operations performed against queues in the structure 902 in 4096 bytes. In this case, additional eUOWDs 1700 may be written in which case they are numbered part m of n.

Figure 18:
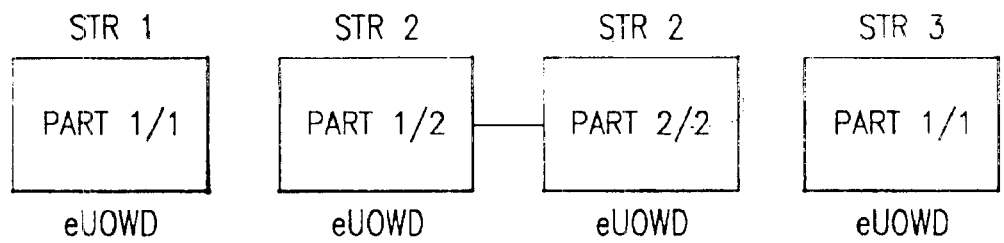
FIG. 18 shows the UOW descriptors (eUOWDs) used for a particular set of list structures.

Assume a UOW that accessed shared queues 106 across three list structures 902. Two eUOWDs 1700 are required to represent the queues/operations targeted to list structure 2. Pictorially we have what is shown in FIG. 18.

When a shared queue manager 108 fails, surviving peers are notified of the peer's failure on a structure by structure basis. Thus, CF Manager 1402 performs recovery on a structure by structure basis.

Consider the following topology: three shared queue managers 108: SQM 1, SQM 2 and SQM 3. SQM 1 and SQM 2 are connected to structures Str 1, Str 2 and Str 3. SQM 3 is only connected to Str 3. When SQM 1 fails SQM 2 is informed about SQM 1's connection failure to structures 1, 2 and 3. SQM 3 is only informed of SQM 1's connection failure to Str 3. In the case of SQM 2, it can recover structures 1, 2 and 3 in parallel.

If more than one eUOWD 1700 needs to be written, it is impossible to write them all in an atomic fashion. Using the example above, it would take four separate IXLLSTE operations to write the four eUOWDs 1700. The shared queue manager 108 writing the eUOWDs 1700 may fail part way through the process of writing the set of eUOWDs 1700.

Figure 19:
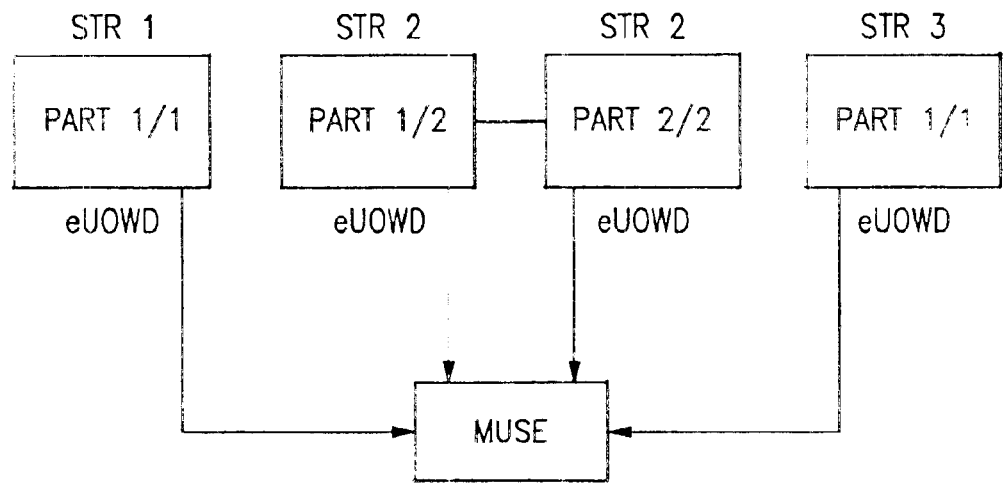
FIG. 19 shows a multistructure UOW summary entry (MUSE).

To support UOWs that access multiple CF list structures 902, the CF Manager 1402 uses a construct called a 'multistructure unit-of-work summary entry' (MUSE) 1902, as shown in FIG. 19.

The MUSE 1902 is mapped by a CSQEMUSE module 1430.

The key of a eUOWD 1700 is structure number.uow ID . . . sequence number.

The key of a MUSE 1902 is structure number=0.uowid.binary zeros. (Structure number zero is used because a structure number of zero is never assigned) Since the UOWid field contains the shared queue manager 108 identification and a time stamp, it is not possible for two MUSEs 1900 to have the same entry key.

For a multistructure unit of work each eUOWD 1700 points to the MUSE 1902. Field eUOWD_Key_Of_Corresponding_Muse points to the corresponding MUSE 1902 provided this is a multistructure unit of work. If this is not a multistructure unit of work then this field is set to X'FFF . . . FF'. This allows restart/peer level recovery processing to determine how to recover the unit of work. The components of the MUSE key are defined in a CSQEPKEY module 1434.

Processing in CSQEWUOW 1462 when writing the eUOWDs 1700:

1. The key of the MUSE 1902 is calculated but the MUSE is not yet written.
2. The set of eUOWDs 1700 are written. The MUSE pointer field in the eUOWD 1700 (to the not yet written MUSE 1902) is initialized with the MUSE-calculated key. If multiple eUOWDs are written for an individual structure 902, sequencing is performed as is done for UOWs that access a single list structure 902 (part m of n).
3. The MUSE 1902 is written. Status (disposition) bits indicate the state of the UOW: begin commit, commit, abort or prepare. Within the MUSE 1902 is a 256-bit bit array that represents the structures 902 that the UOW accessed. Bit 1 is for structure 1, bit 2 is for structure 2, and so on. Bit 0 is unused.
4. The syncpoint activity is performed: abort, commit, prepare.
5. After the syncpoint activity is performed, control returns to the caller. A subsequent call is then made to CSQE-WOUW requesting function code CSQE_Delete_Admin_Table_Entries_For_UOW.
6. Before a eUOWD 1700 is deleted, the eUOWD's adjunct is read and bit eUOWA_SyncPoint_Processing_Complete is set. This means that the eUOWD 1700 is recovered. If multiple eUOWDs 1700 were written for a specific structure 902 then the bit is set on only in the first eUOWD 1700. When peer level recovery sees bit eUOWA_SyncPoint_Processing_Complete set on, it knows it does not need to recover the eUOWD 1700.
7. Turn off corresponding structure bit in the MUSE 1902. If all structure bits now zero, MUSE 1902 is deleted. Version number comparison is employed as multiple shared queue managers 108 may be recovering in parallel. The MUSE 1902 is deleted before the last eUOWD 1700 for the unit of work is deleted.

For example, if the UOW accessed two structures 902 and two eUOWDs 1700 were written then processing the first eUOWD 1700 for structure 1 causes the corresponding MUSE bit to be set off and then the corresponding eUOWD 1700 for structure 1 is deleted.

When processing the second structure 902, the corresponding MUSE bit is turned off. Since all MUSE bits are now zero, the MUSE 1902 is deleted and then the eUOWD 1700 is deleted.

8. The eUOWD 1700 for the structure 902 is deleted. Steps 6 through 8 are re-executed for each structure 902 that the UOW accessed.

Failure Scenarios: Commit and Abort

The following scenarios assume the thread waiting eUOWDs 1700 fails at certain points and then details what peer level recovery processing does. (Peer level recovery is contained in the set of modules 1440 named CSQERWI\*). These scenarios further assume that the UOW disposition is abort or commit. Begin commit and prepare scenarios are discussed in the next session.

Note: All updates to the MUSE 1902 use version number comparison logic. The processing detailed below occurs in CF Manager 1402's Recover Work In Progress (RWIP) component. The checks that are described below are also done when a shared queue manager 108 recovers a failed shared queue manager 108 that was recovering another failed shared queue manager 108 (rolling recovery scenarios).

Case 1: The thread fails before it can write any eUOWDs 1700 to the administrative structure.

Resolution: Peer level recovery treats all messages 204 as inflight and they are aborted.

Case 2: Some or all of the eUOWDs 1700 are written but the thread fails before the corresponding MUSE 1902 can be written.

Resolution: A peer obtains ownership of the eUOWD 1700. It attempts to read the MUSE 1902. The MUSE 1902 is not found. This is an ambiguous situation: does the MUSE 1902 not exist because it was never written, or does it not exist because it was deleted after the eUOWDs 1700 were successfully processed for the unit of work?

If the eUOWD 1700 is not marked eUOWA_SyncPoint_Processing_Complete (which is the case in this scenario), the unit of work is considered to be inflight and the action is to abort. The eUOWDs 1700 are then deleted If the eUOWD 1700 is marked eUOWA_SyncPoint_Processing_Complete (this is jumping ahead a bit to case 6 below but is added here for completeness), then the MUSE 1902 must have been written (but may now be deleted) and the shared queue manager 108 failed after deleting the MUSE 1902 but before deleting all of the corresponding eUOWDs 1700. In this case, the remaining eUOWDs 1700 are deleted.

Case 3: All of the eUOWDs 1700 are written. The MUSE 1902 is written. Queue Manager fails before performing the requested syncpoint operation.

Resolution: MUSE 1902 exists and contains the final UOW disposition. The eUOWDs 1700 are not marked recovered. Final disposition is honored and the syncpoint operation is forward completed. The TROPs 1510 are processed. The first eUOWD 1700 for the structure 902 is marked recovered. Then the MUSE 1902 is updated or deleted based on whether the last structure interest bit is set off. eUOWDs 1700 are deleted. If multiple eUOWDs 1700 were written for the structure 902, they are deleted in reverse order: sequence n, n–1, . . . 1.

Case 4. The MUSE 1902 is successfully written. The TRQSes 1508 and TROPs 1510 in the eUOWD 1700 are being processed by the owning shared queue manager 108. Before processing all of the TRQSes 1508 and TROPs 1510 the owning shared queue manager 108 fails.

Resolution: A peer shared queue manager 108 sees that there is a nonzero disposition in the MUSE 1902. The recovering peer has no idea how far the originating shared queue manager 108 got. It re-attempts to process all the TRQSes 1508 and TROPs 1510 in the eUOWD 1700. Those that were already processed before the owning shared queue manager 108 failed will fail when the peer attempts to complete them. Those not yet processed by the failed shared queue manager 108 will be successfully completed when processed by the surviving peer. After the peer processes the eUOWD 1700, it marks it as recovered before it updates/deletes the MUSE 1902. After updating/deleting the MUSE 1902, the recovering peer deletes the eUOWDs 1700.

Case 5. The MUSE 1902 is successfully written. The TRQSes 1508 and TROPs 1510 indicated in the eUOWD 1700 are all processed by the owning shared queue manager 108. The owning shared queue manager 108 marks the first eUOWD 1700 recovered. Before it can reset the corresponding structure bit in the MUSE 1902 the shared queue manager 108 fails.

Resolution: A peer shared queue manager 108 gains ownership of the eUOWD 1700. It sees that the eUOWA_SyncPoint_Processing_Complete indication is set in the eUOWD 1700. It attempts to read the MUSE 1902. The MUSE 1902 is successfully read. It turns off the corresponding structure bit in the MUSE 1902. If all bits are not zero, it updates the entry. If all bits are zero, it deletes the entry.

Case 6: The MUSE 1902 is successfully written. The TRQSes 1508 and TROPs 1510 in the eUOWD 1700 are all processed by the owning shared queue manager 108. It marks the first eUOWD 1700 recovered. The shared queue manager 108 updates the structure bit in the MUSE 1902. Other bits are set so the MUSE 1902 cannot be deleted. The shared queue manager 108 fails before it can delete the eUOWDs 1700.

Resolution: A peer shared queue manager 108 gains ownership of the eUOWD 1700. It sees that the eUOWA_SyncPoint_Processing_Complete indication is set in the eUOWD 1700. It attempts to read the MUSE 1902. The MUSE 1902 is successfully read. The corresponding structure bit is set off. It begins to delete the eUOWDs 1700 in reverse order. Note: some of the eUOWDs 1700 may already have been deleted by the owning shared queue manager 108.

Case 7: The MUSE 1902 is successfully written. The TRQSes 1508 and TROPs 1510 indicated in the eUOWD 1700 are all processed by the owning shared queue manager 108. It marks the first eUOWD 1700 recovered. The shared queue manager 108 updates the structure bit in the MUSE 1902. Other bits are not set. The shared queue manager 108 deletes the MUSE 1902. The shared queue manager 108 then fails before it can delete the eUOWDs 1700.

Resolution: A peer shared queue manager 108 gains ownership of the eUOWD 1700. It sees that the eUOWA_SyncPoint_Processing_Complete indication is set in the eUOWD 1700. It attempts to read the MUSE 1902. The MUSE 1902 is not successfully read. It begins to delete the eUOWDs 1700 in reverse order. Note: some of the eUOWDs 1700 may already have been deleted by the owning shared queue manager 108

Case 8: Rolling Recovery. A peer has gained ownership of an eUOWD 1700 on behalf of a failed peer. While recovering the eUOWD 1700 it may fail part way through its peer recovery process. Surviving peers see this failure and race to steal ownership of the recovery process. The shared queue manager 108 that steals ownership does all the same checks as detailed in the various cases above.

Failure Scenarios: Begin Commit and Prepare

A unit of work marked 'begin commit' or 'prepare' can only be recovered by the shared queue manager 108 that wrote the eUOWDs 1700. In the case of 'begin commit', the final resolution of the unit of work (which eventually will be either commit or abort) is deduced from the shared queue manager 108's private log. In the case of 'prepare', the final disposition of the unit of work must wait until RESOLVE time.

If a MUSE 1902 exists and its current disposition is either 'begin commit' or 'prepare', then a peer instance of the shared queue manager 108 cannot recover the eUOWD 1700. When a shared queue manager 108 determines that an eUOWD 1700 is in either one of these two states, it looks for the another eUOWD 1700. The corresponding MUSE 1902 is not deleted. It will be recovered when the owning shared queue manager 108 restarts.

Thread Processing

CSQETHDP 1450 keeps track of the highest number structure 902 accessed by the unit of work. This is maintained in the eTHRD control block. This information is used when writing out the eUOWDs 1700 to the administrative structure.

SyncPoint Operations

The messages 204 read and put by a unit of work are eventually aborted, committed or prepared, henceforth referred to as a syncpoint operation. For nonrecovery scenarios, this syncpoint processing is implemented in CSQESYN1 1448 (CF Manager SyncPoint Services).

CSQESYN1 1448 processes the thread block structure 1500, which consists in part of a 255 entry array, one entry 1502 for each structure 902 that the unit of work may access. The syncpoint operation accesses the thread block structure 1500 to perform the syncpoint event.

Syncpointing is done on a sequential basis—this means that if structure one was accessed it is processed first, then followed by structure 2, and so on.

Thread block structure 1500 is processed by array entry 1502, from array entry 1 to the highest structure 902 accessed by the unit of work. For example, if a unit of work accessed structures 1, 5 and 8 then only the first eight array entries 1502 are processed (rather than looking at all 255 array entries). CSQEHTDP is responsible for monitoring the highest structure 902 accessed by the unit of work.

While a particular embodiment has been shown and described, various modifications will be apparent to those skilled in the art. While the invention has particular application in a Parallel Sysplex environment, it is not limited to such an environment and may be used in other environments as well.

What is claimed is:

1. A method of implementing a shared message queue using a list structure comprising the steps of:
   defining a list comprising a sequence of list entries, each of said list entries corresponding to a message in said queue and having an associated list entry key, each list entry key corresponding to an uncommitted message falling within an uncommitted key range defining an uncommitted portion of said list and each list entry key corresponding to a committed message falling within a committed key range defining a committed portion of said list;
   in response to a request to write a message to said queue, adding a list entry to said list having a list entry key within said uncommitted key range; and
   in response to a request to commit said message to said queue, modifying the list entry key associated with said list entry to fall within said committed key range to move said list entry to the committed portion of said list.

2. The method of claim 1 in which list entries in said uncommitted portion of said list have a defined order as determined by said list entry keys that is preserved when said list entries are moved to the committed portion of said list.

3. The method of claim 1, comprising the further step of:
   in response to a request to read a message from said queue, retrieving a list entry whose list entry key has an extreme value in said committed key range.

4. The method of claim 3 in which said extreme value is a lowest value in said committed key range.

5. The method of claim 1 in which said list is a first list, said method comprising the further step of:
   in response to a request to read a message from said queue, moving a list entry from the committed portion of said fist list to a second list.

6. The method of claim 5, further comprising the step of:
   in response to a request to abort a read of said message from said queue, moving said list entry back from said second list to the committed portion of said first list.

7. The method of claim 5, further comprising the step of:
   in response to a request to commit a read of said message from said queue, removing said list entry from said second list.

8. The method of claim 1 in which said list entry keys in said uncommitted key range are assigned in order of message priority.

9. The method of claim 8 in which said list entry keys in said uncommitted key range are assigned in order of arrival time for messages of a given priority.

10. The method of claim 1 in which each list entry key has a more significant portion indicating the list portion to which the corresponding list entry belongs and a less significant portion indicating the order of said list entry in said list portion.

11. The method of claim 1, further comprising the step of:
    in response to a request from a requester to wait for a message in said queue;
    detecting a change in state of the committed portion of said queue from an empty state to a not-empty state;
    in response to detecting a change in state of the committed portion of said queue from an empty state to a not-empty sate, notifying said requester of said change of state.

12. Apparatus for implementing a shared message queue using a list structure, comprising:
    means for defining a list comprising a sequence of list entries, each of said list entries corresponding to a message in said queue and having an associated list entry key, each list entry key corresponding to an uncommitted message falling within an uncommitted key range defining an uncommitted portion of said list and each list entry key corresponding to a committed message falling within a committed key range defining a committed portion of said list;
    means responsive to a request to write a message to said queue for adding a list entry to said list having a list entry key within said uncommitted key range; and means responsive to a request to commit said message to said queue for modifying the list entry key associated with said list entry to fall within said committed key range to move said list entry to the committed portion of said list.

13. The apparatus of claim 12, further comprising:

means responsive to a request to read a message from said queue for retrieving a list entry whose list entry key has an extreme value in said committed key range.

14. The apparatus of claim 12 in which said list is a first list, said apparatus further comprising:

means responsive to a request to read a message from said queue for moving a list entry from the committed portion of said first list to a second list defined for said queue.

15. The apparatus of claim 14, further comprising:

means responsive to a request to abort a read of said message from said queue for moving said list entry back from said second list to the committed portion of said first list.

16. The apparatus of claim 14, further comprising:

means responsive to a request to commit a read of said message from said queue for removing said list entry from said second list.

17. The apparatus of claim 12, further comprising:

means responsive to a request from a requester to wait for a message in said queue for detecting a change in state of the committed portion of said queue from an empty state to a not-empty state and, in response to detecting said change in state, notifying said requester of said change of state.

18. A program storage device readable by a machine, tangibly embodying a program of instructions executable by the machine to perform method steps for of implementing a shared message queue using a list structure, said method steps comprising:

defining a list comprising a sequence of list entries, each of said list entries corresponding to a message in said queue and having an associated list entry key, each list entry key corresponding to an uncommitted message falling within an uncommitted key range defining an uncommitted portion of said list and each list entry key corresponding to a committed message falling within a committed key range defining a committed portion of said list;

in response to a request to write a message to said queue, adding a list entry to said list having a list entry key within said uncommitted key range; and in response to a request to commit said message to said queue, modifying the list entry key associated with said list entry to fall within said committed key range to move said list entry to the committed portion of said list.

19. The program storage device of claim 18, comprising the further step of:

in response to a request to read a message from said queue, retrieving a list entry whose list entry key has an extreme value in said committed key range.

20. The program storage device of claim 18 in which said list is a first list, said method comprising the further step of:

in response to a request to read a message from said queue, moving a list entry from the committed portion of said first list to a second list defined for said queue.

21. The program storage device of claim 20, further comprising the step of:

in response to a request to abort a read of said message from said queue, moving said list entry back from said second list to the committed portion of said first list.

22. The program storage device of claim 20, further comprising the step of:

in response to a request to commit a read of said message from said queue, removing said list entry from said second list.

23. The program storage device of claim 18, further comprising the step of:

in response to a request from a requester to wait for a message in said queue:

detecting a change in state of the committed portion of said queue from an empty state to a not-empty state;

in response to detecting a change in state of the committed portion of said queue from an empty state to a not-empty state, notifying said requester of said change of state.

* * * * *